US009095946B2

(12) United States Patent
Kotula et al.

(10) Patent No.: US 9,095,946 B2
(45) Date of Patent: Aug. 4, 2015

(54) MODULAR TOOLING APPARATUS HAVING SERRATED TEETH FOR ORBITAL AND LINEAR ADJUSTMENT

(71) Applicant: Norgren Automation Solutions, LLC, Saline, MI (US)

(72) Inventors: Ronald Andrew Kotula, Troy, MI (US); Donald Van Zile, III, New Baltimore, MI (US); Brandon Scott Jacobi, Warrren, MI (US); Michael A. Filipiak, Ann Arbor, MI (US); James R. Kalb, Petersburg, MI (US); Keith M. Price, Clinton, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 0 days.

(21) Appl. No.: 13/796,008

(22) Filed: Mar. 12, 2013

(65) Prior Publication Data
US 2013/0189019 A1 Jul. 25, 2013

Related U.S. Application Data

(63) Continuation-in-part of application No. 13/368,959, filed on Feb. 8, 2012.

(60) Provisional application No. 61/440,464, filed on Feb. 8, 2011.

(51) Int. Cl.
*F16C 11/10* (2006.01)
*F16M 11/12* (2006.01)
(Continued)

(52) U.S. Cl.
CPC .............. *B23Q 1/26* (2013.01); *B25J 15/0061* (2013.01); *F16C 11/103* (2013.01);
(Continued)

(58) Field of Classification Search
CPC ........ B25J 15/0061; B62D 7/16; F16C 11/04; F16C 11/10; F16C 11/103; F16M 11/06; F16M 11/08; F16M 11/10; F16M 11/12; F16M 11/121; F16M 11/126
USPC ............... 403/53, 57, 58, 65, 91, 92, 97, 100, 403/103, 104, 84; 901/27–29
See application file for complete search history.

(56) References Cited

U.S. PATENT DOCUMENTS 920,713 A * 5/1909 Auster ............................ 403/97
1,706,215 A   3/1929 Davidson
(Continued)

FOREIGN PATENT DOCUMENTS

DE    2246600 A    11/1977
EP    1 108 945    6/2001
(Continued)

OTHER PUBLICATIONS

International Search Report from the European Patent Office dated Apr. 16, 2007 for European Patent Application No. 06090092.5-1252.
(Continued)

*Primary Examiner* — Daniel P Stodola
*Assistant Examiner* — Josh Skroupa
(74) *Attorney, Agent, or Firm* — Young Basile Hanlon & MacFarlane P.C.

(57) ABSTRACT

A modular tooling apparatus includes a first coupler portion, a second coupler portion, a locking member, and a friction member. The first coupler portion and the second coupler portion are rotationally adjustable with respect to one another. The locking member is moveable to a locked position wherein the locking member engages the first coupler portion and the second coupler portion to restrain the first coupler portion from rotating with respect to the second coupler portion. The friction member engages the first coupler portion and the second coupler portion to resist rotation of the first coupler portion with respect to the second coupler portion when the locking member is not in the locked position.

17 Claims, 16 Drawing Sheets

(51) Int. Cl.
  *B25J 15/00* (2006.01)
  *B23Q 1/26* (2006.01)
  *F16M 11/04* (2006.01)
  *F16M 11/10* (2006.01)

(52) U.S. Cl.
  CPC ............ *F16M 11/048* (2013.01); *F16M 11/10* (2013.01); *F16M 11/121* (2013.01); *F16M 2200/024* (2013.01); *F16M 2200/028* (2013.01); *F16M 2200/066* (2013.01); *Y10T 403/32049* (2015.01); *Y10T 403/32262* (2015.01); *Y10T 403/32368* (2015.01); *Y10T 403/32418* (2015.01)

(56) References Cited

U.S. PATENT DOCUMENTS

| | | | |
|---|---|---|---|
| 4,062,203 A * | 12/1977 | Leonard et al. | 464/38 |
| 5,039,118 A * | 8/1991 | Huang | 403/97 |
| 5,520,474 A | 5/1996 | Liu | |
| 6,286,968 B1 * | 9/2001 | Sailer et al. | 403/97 |
| 6,503,018 B2 * | 1/2003 | Hou et al. | 403/97 |
| 6,619,872 B2 | 9/2003 | Crorey et al. | |
| 7,093,313 B2 * | 8/2006 | DeBraal et al. | 248/292.12 |
| 7,107,915 B2 * | 9/2006 | Laws et al. | 248/436 |
| 8,294,815 B2 * | 10/2012 | Matsuhashi et al. | 248/166 |
| 2001/0004431 A1 | 6/2001 | Crorey et al. | |
| 2006/0285915 A1 | 12/2006 | Dellach et al. | |

FOREIGN PATENT DOCUMENTS

| | | | |
|---|---|---|---|
| EP | 1 729 054 | 12/2006 | |
| GB | 1411331 A | 10/1975 | |
| GB | 2246600 A | 6/1981 | |
| GB | 2246600 * | 2/1992 | ............... F16B 2/06 |
| JP | 57071758 A1 | 5/1982 | |
| JP | 62-023326 U | 2/1987 | |
| NL | 29202 C | 3/1933 | |

OTHER PUBLICATIONS

Office Action dated Feb. 3, 2015 from Japan's Patent Office.
English Translation of Office Action dated feb. 3, 2015 from Japan's Patent Office.

* cited by examiner

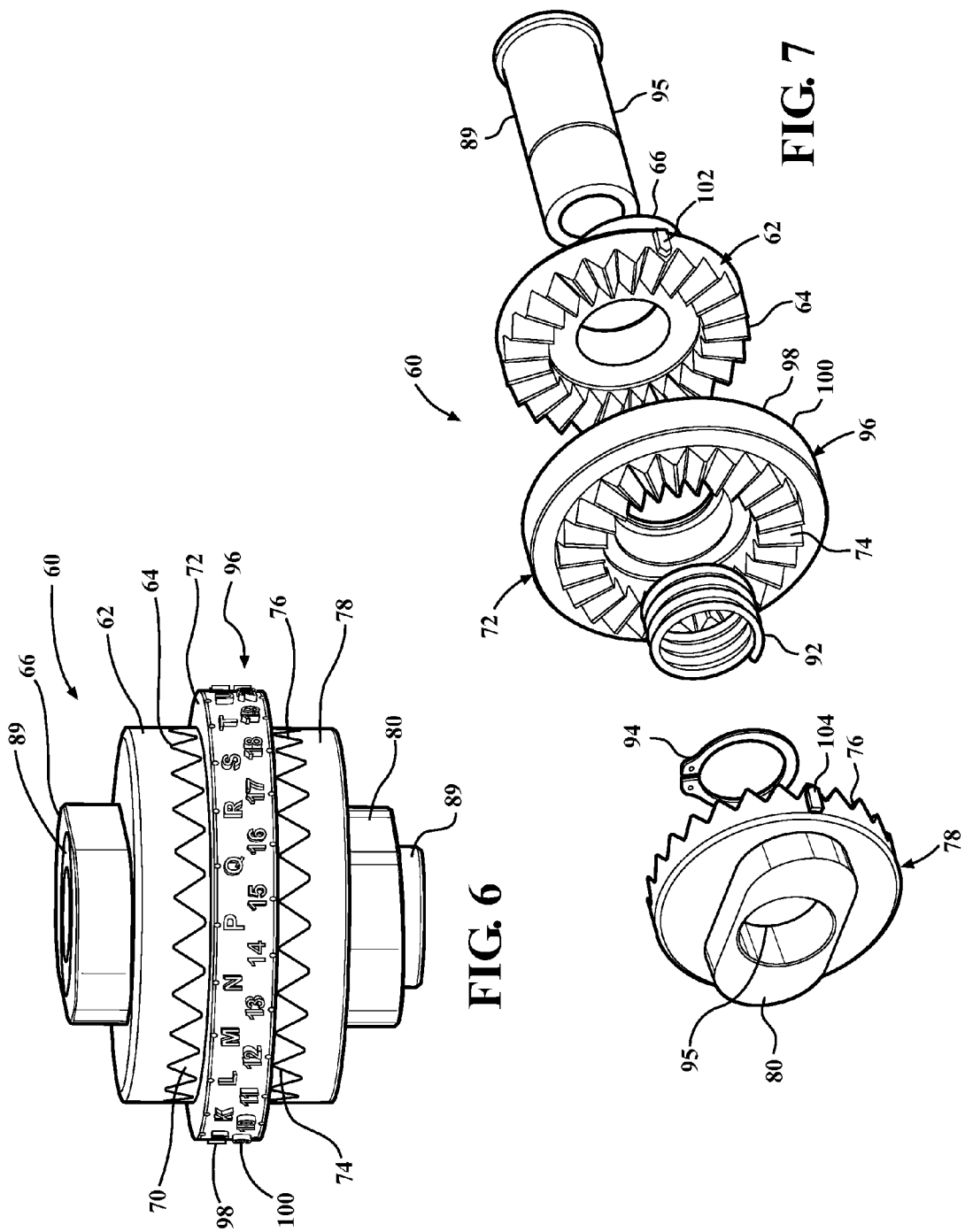

MODULAR TOOLING APPARATUS HAVING SERRATED TEETH FOR ORBITAL AND LINEAR ADJUSTMENT

CROSS-REFERENCE TO RELATED APPLICATIONS

This application is a continuation-in-part of U.S. patent application Ser. No. 13/368,959, filed on Feb. 8, 2012, which claims the benefit of U.S. Provisional Patent Application Ser. No. 61/440,464, filed on Feb. 8, 2011.

TECHNICAL FIELD

The present invention relates to a modular tooling apparatus having orbital and linear adjustments, and in particular, a modular tooling apparatus having serrated teeth that provide for accurate and repetitive orbital, rotational, and linear adjustment of modular tooling connected to the modular tooling apparatus.

BACKGROUND

With the advent of mechanical manipulators and robotic arms, various tooling assemblies and work piece handling devices have been designed to quickly connect and disconnect to mechanical manipulators and robotic arms so that a variety of modular tooling assemblies can be utilized with the same manipulator. Flexibility and adjustability are preferably designed into the tooling assemblies so that the tooling assemblies can be configured for a variety of work piece configurations. Previous tooling assemblies have utilized various sections of tubing interconnected by various brackets and mounts for fixturing a variety of work pieces, but such designs are typically rigid and provide little or no adjustment in the tooling assembly. Other designs have utilized extrusions or slide mounts to allow the sections of tubing to be adjusted along a linear path of travel, but such designs have a limited amount of flexibility, as they provide only one degree or axis of adjustment.

Other known designs have utilized ball mounts to provide rotational or orbital adjustment of the tubing. Such ball mounts typically provide a bracket that receives and clamps a spherical ball through the use of the bracket and a conventional fastener. Due to the configuration of the clamps, such ball mounts typically do not provide 360° rotational movement. In addition, these designs are susceptible to slipping, especially when such tooling mounts are exposed to various grease and oils, as well as random forces that are common in an industrial environment. If the ball mount slips, the work piece-handling boom may become misaligned with respect to the work piece thereby requiring the workstation to be shut down and readjusted. These shut downs create inefficiencies that are undesirable in an industrial environment.

Other modular tooling apparatuses have utilized opposing serrated teeth to provide rotational or orbital adjustment of a first and second coupling about an axis of rotation. The serrated teeth provide predetermined rotational adjustment of the first and second couplings relative to one another while assuring that the couplings will not rotate or slip with respect to one another when the serrated teeth are engaged in a tightened position. A disadvantage to the serrated teeth is that they provide a predetermined number of set positions, thereby limiting the possible positions of the modular tooling apparatus. Another disadvantage in the serrated teeth adjustment is that the serrated teeth must be completely disengaged from one another in order to adjust the position of the couplings. Thus, adjusting the couplings by rotating the serrated teeth relative to one another can be a rather cumbersome and difficult task. Since there may be several pieces of modular tooling connected to the serrated teeth, it may become even more difficult to adjust the positioning of the serrated teeth, especially in an industrial environment. Such difficulties cause inefficiencies that are undesirable in an industrial environment.

It would be desirable to provide a modular tooling apparatus that provides a quick and simple adjustment mechanism for providing numerous, multi-axis adjustments of a modular tool without the risk of the modular tooling apparatus slipping and misaligning.

SUMMARY

Modular tooling apparatuses are disclosed herein.

One aspect of the disclosed embodiments is a modular tooling apparatus that includes a first coupler portion, a second coupler portion, a locking member, and a friction member. The first coupler portion and the second coupler portion are rotationally adjustable with respect to one another. The locking member is moveable to a locked position wherein the locking member engages the first coupler portion and the second coupler portion to restrain the first coupler portion from rotating with respect to the second coupler portion. The friction member engages the first coupler portion and the second coupler portion to resist rotation of the first coupler portion with respect to the second coupler portion when the locking member is not in the locked position.

Another aspect of the disclosed embodiments is a modular tooling apparatus that includes a first coupler portion having a first contoured surface, and a second coupler portion having a second contoured surface. The first coupler portion and the second coupler portion are rotationally adjustable with respect to one another. The modular tooling apparatus also includes a locking member having a third contoured surface and a fourth contoured surface. The locking member is moveable to a locked position with respect to the first coupler portion and the second coupler portion in which the third contoured surface of the locking member engages the first contoured surface of the first coupler portion and the fourth contoured surface of the locking member engages the second contoured surface of the second coupler portion to restrain the first coupler portion from rotating with respect to the second coupler portion. A friction member engages the first coupler portion and the second coupler portion to resist rotation of the first coupler portion with respect to the second coupler portion when the locking member is not in the locked position.

Another aspect of the disclosed embodiments is a modular tooling apparatus that includes a rod that extends along a longitudinal axis, a first coupler portion that is substantially cylindrical and has a first contoured surface at an axial end thereof, and a second coupler portion that is substantially cylindrical, defines a bore having a shoulder formed therein, and has a second contoured surface at an axial end thereof. The first coupler portion is at least partially disposed within the bore of the second coupler portion, the rod extends through the first coupler portion and the second coupler portion, and first coupler portion and the second coupler portion are rotationally adjustable with respect to one another around the longitudinal axis. The modular tooling apparatus also includes a locking member having a third contoured surface and a fourth contoured surface, wherein the rod extends through the locking member and the locking member is moveable to a locked position with respect to the first coupler portion and the second coupler portion in which the third contoured surface of the locking member engages the first contoured surface of the first coupler portion and the fourth contoured surface of the locking member engages the second contoured surface of the second coupler portion to restrain the first coupler portion from rotating with respect to the second coupler portion. A friction member is connected to the second coupler portion such that the friction member rotates substantially in unison with the first coupler portion and the friction member frictionally engages the shoulder in the bore in the second coupler portion to resist rotation of the first coupler portion with respect to the second coupler portion when the locking member is not in the locked position.

BRIEF DESCRIPTION OF THE DRAWINGS

The various other uses of the present invention will become more apparent by referring to the following detailed description and drawings in which:

FIG. 6 is a perspective view showing the contoured surface on a spacer of the modular tooling apparatus of the present invention;

FIG. 7 is an exploded view showing the spacer and the contoured surfaces of the modular tooling apparatus of the present invention;

DETAILED DESCRIPTION

Figure 1:
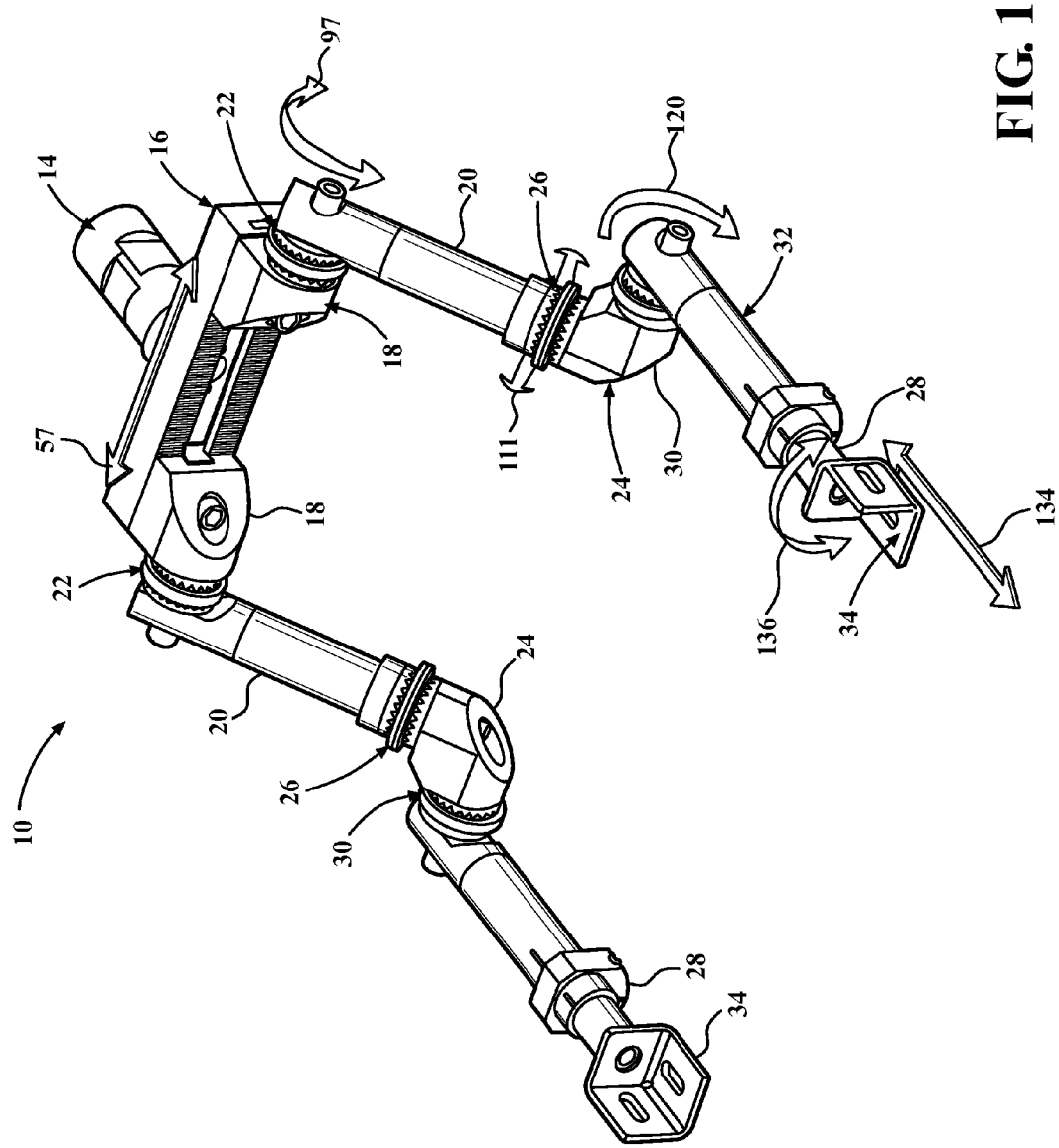
FIG. 1 is a perspective view showing the modular tooling apparatus of the present invention.
Figure 2:
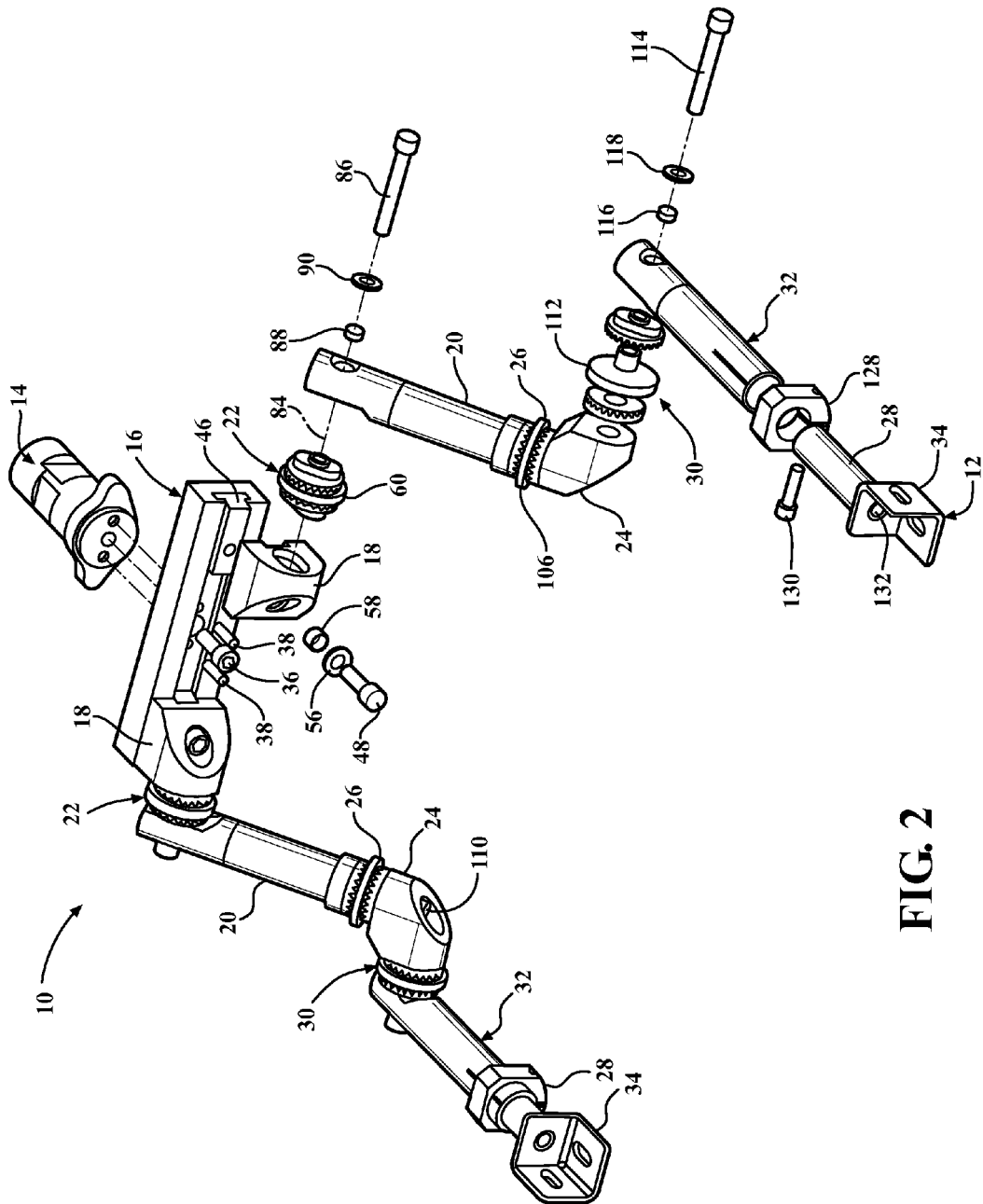
FIG. 2 is an exploded view showing the modular tooling apparatus of the present invention.

The present invention provides a modular tooling apparatus 10 that provides orbital, rotational, and linear spatial adjustments to at least one conventional modular tool 12 connected to the modular tooling apparatus 10. As seen in FIGS. 1 and 2, the modular tooling apparatus 10 may be connected to a male portion 14 of a quick disconnect (not shown) which in turn may be received by a female portion (not shown) of the quick disconnect. The female portion of the quick disconnect is connected to a manipulator, such as a robotic arm (not shown). The male portion 14 of the quick disconnect may be connected to a rack or mounting member 16 which in turn provides linear adjustment to a base coupling 18 that is releasably and adjustably connected to the rack 16. A boom arm 20 may be releasably and adjustably connected to the base coupling 18 through mating contoured surfaces 22 formed between the base coupling 18 and the boom arm 20. The boom arm 20 extends away from the base coupling 18 wherein a substantially 90° elbow coupling 24 is releasably and adjustably connected to the end of the boom arm 20 through a second set of contoured surfaces 26. A telescopic boom arm 32 having a shovel arm 28 may then be connected to the elbow coupling 24 through the use of a third set of contoured surfaces 31. The telescopic boom arm 32 provides linear and rotational adjustment of the shovel arm 28 along a longitudinal axis of the telescopic boom arm 32. A modular tool 12, such as a shovel 34, may be connected to the end of the shovel arm 28 for engaging a work piece (not shown). Other modular tools 12 may include pneumatic grippers, pneumatic clamps, vacuum cups, and other material-handling devices. Similar assemblies comprising the same or different combinations of the base coupling 18, the boom arm 20, the elbow coupling 24, the telescopic boom arm 32, the shovel arm 28, and the shovel 34 may be attached to the rack 16, as previously described, so as to provide for the support and positioning of multiple modular tools 12.

Figure 3:
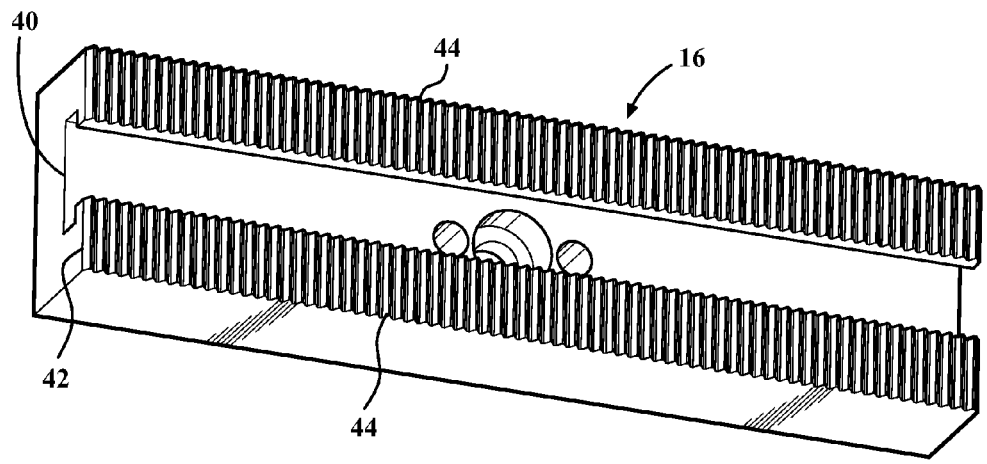
FIG. 3 is a perspective view of a rack of the modular tooling apparatus of the present invention.
Figure 4:
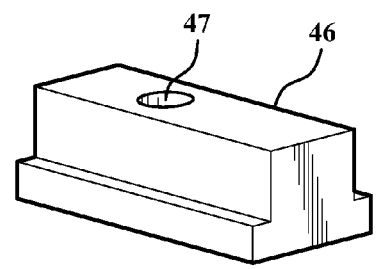
FIG. 4 is a perspective view of a substantially T-shaped slide of the modular tooling apparatus of the present invention.

In order to provide the modular tooling apparatus 10 with a first degree of linear adjustment, the rack 16 is positioned and connected to the male portion 14 of the quick disconnect through the use of a conventional fastener 36 and a pair of dowel rods 38. The rack 16 has a substantially rectangular configuration with a substantially T-shaped slot 40 extending the length of the rack 16, as seen in FIGS. 1-3. A side 42 of the rack 16 is open to the T-shaped slot 40 and has a contoured surface, such as serrated teeth 44. The serrated teeth 44 extend substantially linearly on both sides of the T-shaped slot 40 along the entire length of the side 42 of the rack 16. The rack 16 may be fabricated from a high strength, lightweight material, such as aluminum.

Figure 5:
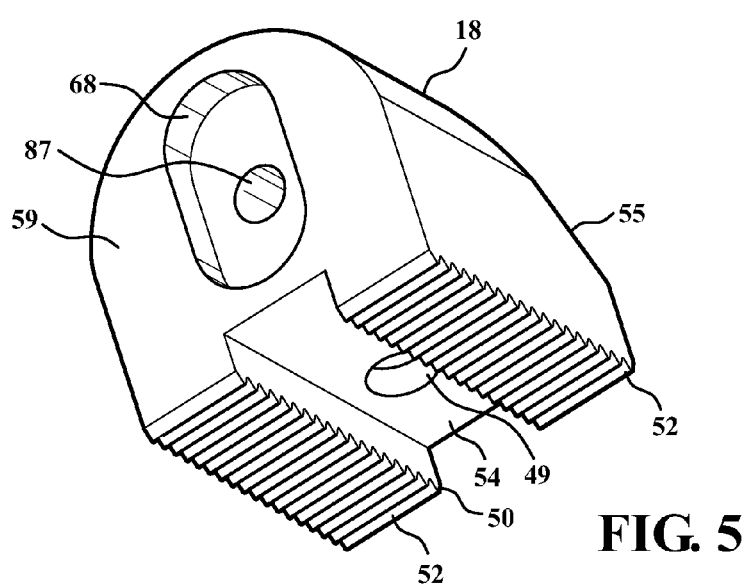
FIG. 5 is a perspective view of the base coupling of the modular tooling apparatus of the present invention.

To allow for linear adjustment of the base coupling 18 relative to the rack 16, a substantially T-shaped slide 46 matingly and slidingly engages the T-shaped slot 40 formed in the rack 16, as seen in FIGS. 1-4. The T-shaped slide 46 has a threaded aperture 47 formed therein for receiving a conventional fastener 48 which extends through an aperture 49 formed through a first side 50 to a second side 55 of the base coupling 18, as seen in FIGS. 1-2 and 5. The base coupling 18 has a substantially trapezoidal shape wherein the first side 50 of the base coupling 18 has two substantially parallel rows of serrated teeth 52 formed therein with a substantially rectangular recess 54 formed between the two rows of serrated teeth 52. The rectangular recess 54 in the first side 50 of the base coupling 18 receives a portion of the T-shaped slide 46 provided in the rack 16. By threading the fastener 48 through the aperture 49 of the base coupling 18 and into the threaded aperture 47 provided in the T-shaped slide 46 of the rack 16, the serrated teeth 52 on the base coupling 18 may be securely mated to the serrated teeth 44 provided on the rack 16. A washer 56 and a spring 58 may be assembled to the fastener 48 for engaging the base coupling 18 such that the base coupling 18 is biased against the rack 16. The spring biased force allows the base coupling 18 to maintain engagement with the rack 16 while the fastener 48 is loosened such that the base coupling 18 will not become disengaged from the rack 16. Once the fastener 48 is loosened, the user need only pull the base coupling 18 against the biasing force of the spring 58 in order to disengage the serrated teeth 52 of the base coupling 18 from the serrated teeth 44 of the rack 16 so as to linearly adjust the position of the base coupling 18 relative to the rack 16. Thus, the base coupling 18 may be adjusted linearly along a longitudinal axis of the rack 16 as shown by arrow 61.

Figure 8:
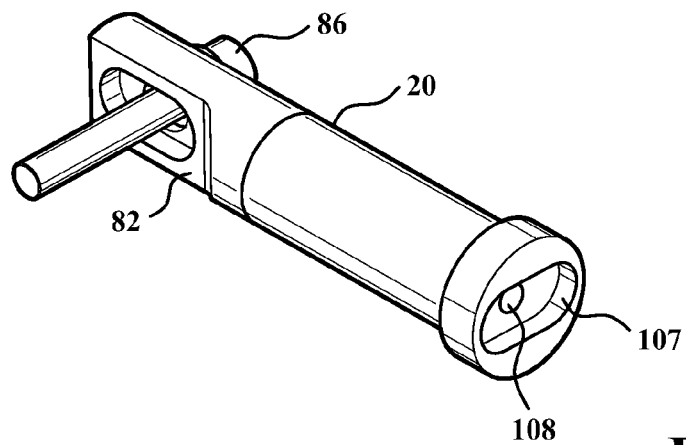
FIG. 8 is a perspective view of the boom rod of the modular tooling apparatus of the present invention.

In order to provide orbital adjustment of the boom arm 20 relative to the base coupling 18, the contoured surfaces 22 provide a tooth insert assembly 60 that is connected to and between a third side 59 of the base coupling 18 and one end of the boom arm 20. The tooth insert assembly 60 includes a first tooth insert 62 having a substantially cylindrical configuration with a contoured surface, such as serrated teeth 64, formed in a substantially circular configuration on one side of the first tooth insert 62 and facing away from the base coupling 18, as seen in FIGS. 1-2 and 6-7. An opposite side of the first tooth insert 62 is adjacent the third side 59 of the base coupling 18 and provides a projection 66 having a substantially oval configuration. The projection 66 on the first tooth insert 62 is received by a substantially oval recess 68 formed in the third side 59 of the base coupling 18. The serrated teeth 64 of the first tooth insert 62 matingly engage a contoured surface, such as serrated teeth 70, formed on one side of a locking member or substantially cylindrical spacer 72 of the tooth insert assembly 60. The serrated teeth 70 on the spacer 72 are formed in a substantially circular manner as similarly described on the first tooth insert 62. The spacer 72 also has another contoured surface, such as serrated teeth 74, formed on the opposite side of the spacer 72. The serrated teeth 74 are formed in a substantially circular manner, as similarly described with the serrated teeth 70 of the spacer 72. The serrated teeth 74 of the spacer 72 matingly engage a contoured surface, such as serrated teeth 76, formed on a second tooth insert 78 of the tooth insert assembly 60. The second tooth insert 78 is similar to the first tooth insert 62 in that it also provides a substantially oval projection 80 extending from an opposite side of the second tooth insert 78 from that of the serrated teeth 76. The oval projection 80 on the second tooth insert 78 is matingly received by a substantially oval recess 82 provided on one end of the boom arm 20, as seen in FIGS. 1-2 and 8. The boom arm 20, the second tooth insert 78, the spacer 72, the first tooth insert 62, and the third side of the base coupling 18 all provide apertures that are coaxially aligned along a common longitudinal axis 84. A conventional fastener 86 extends along the axis 84 through the apertures of the boom arm 20 and the tooth insert assembly 60 and threads into a threaded aperture 87 provided in the base coupling 18. The fastener 86 adjustably and releasably connects the boom arm 20 to the base coupling 18 through the use of the tooth insert assembly 60. A tubular sleeve 89 extends through the tooth insert assembly 60 along the longitudinal axis 84 and receives the fastener 86. A spring 88 and a washer 90 may be assembled to the fastener 86 so as to bias the boom arm 20 against the tooth insert assembly 60 thereby biasing the tooth insert assembly 60 against the base coupling 18. This helps to secure the position of the boom arm 20, relative to the tooth insert assembly 60 and relative to the base coupling 18, upon the loosening of the fastener 86. A spring 92 and snap ring 94 are also provided between the first tooth insert 62 and the spacer 72 of the tooth insert assembly 60 wherein the snap ring 94 is seated in a recess 95 of the sleeve 89. The spring 92 biases the spacer 72 toward the second tooth insert 78 and away from the first tooth insert 62. This helps maintain the position of the first tooth insert 62, the spacer 72, and the second tooth insert 78 upon the loosening of the fastener 86.

To provide incremental adjustment of the base coupling 18 relative to the boom arm 20, the serrated teeth 70, 74 on opposite sides of the spacer 72 of the tooth insert assembly 60 are offset by 0.6°, as seen in FIGS. 6-7. Thus, the serrated teeth 70 on the first side of the spacer 72 are spaced at 15° angles so as to provide twenty-four (24) teeth 70 about the substantially circular spacer 72 which matingly engage the serrated teeth 64 of the first tooth insert 62 of the tooth insert assembly 60. The serrated teeth 74 on the opposite side of the spacer 72 are spaced at 14.4° angles, thereby providing a total of twenty-five (25) serrated teeth 74 on the opposite side of the circular spacer 72. The serrated teeth 74 on the spacer 72 matingly engage the serrated teeth 76 provided on the second tooth insert 78 of the tooth insert assembly 60. The offset angles on the spacer 72 of the tooth insert assembly 60 provide a multitude of rotational adjustments between the base coupling 18 and the boom arm 20, as shown by arrow 97.

In order to have a reference as to the position of the base coupling 18 and the boom arm 30, the spacer 72 has alphanumeric indicia 96 formed on the outer surface of the spacer 72. The alphanumeric indicia 96 provide a different letter 98 at each root of the serrated teeth 74 on one side of the spacer 72. A different number 100 is provided at every root of the serrated teeth 70 on the opposite side of the spacer 72. A reference indicator 102 is provided on an outer surface of the first tooth insert 62 of the tooth insert assembly 60, and a second reference indicator 104 is provided on an outer surface of the second tooth insert 78 of the tooth insert assembly 60. The reference indicators 102, 104 are fabricated from a narrow piece of raised material attached to the outer surfaces of the first and second tooth inserts, 60, 78, respectively.

By having the serrated teeth 70, 74 of the spacer 72 spaced at 15° intervals on the first side of the spacer 72 and at 14.4° intervals on the second side of the spacer 72, rotational or orbital adjustment of the base coupling 18 relative to the boom arm 20 may be provided at every 0.6 degrees of rotational interval. Thus, the modular tooling apparatus 10 provides for six hundred (600) different incremental rotational adjustments of the base coupling 18 relative to the boom arm 20. For instance, by placing the reference indicator 102 on the first tooth insert 62 on the numeral "1" on the first side of the spacer 72, the reference indicator 104 on the second tooth insert 78 may be placed on any of the twenty-four (24) letters 98 (letters "I" and "O" have been eliminated in order not to cause confusion with the numerals "1" and "0") to provide for twenty-four (24) different incremental positions when the reference indicator 102 on the first tooth insert 62 is on the number "1". When the reference indicator 102 on the first tooth insert 62 is placed on the number "2" on the first side of the spacer 72, the reference indicator 104 on the second tooth insert 78 may be moved to any of the twenty-four (24) letters 98 on the second side of the spacer 72 to provide an additional twenty-four (24) incremental positions. This process may continue in order to realize all of the six hundred (600) positions of incremental adjustment.

In order to further extend the modular tooling 12, the end of the boom arm 20 opposite the base coupling 18 is connected to a tooth insert assembly 106 that is similar to the tooth insert assembly 60. That is, the end of the boom arm 20 has a substantially oval recess 107 for matingly receiving a substantially oval projection provided on a first tooth insert of the tooth insert assembly 106. The tooth insert assembly 106 is similarly connected to the 90° elbow coupling 24 in that the elbow coupling 24 provides a substantially oval recess for matingly receiving a substantially oval projection provided on a second tooth insert of the tooth insert assembly 106. The elbow coupling 24 has a fastener 110 which extends through an aperture provided in a first side of the elbow coupling 24 and through the tooth insert assembly 106. The fastener 110 also threads into a threaded aperture 109 provided in the end of the boom arm 20. By loosening the fastener 110, the elbow coupling 24 may be rotatably adjusted with respect to the boom arm 20 by rotating the serrated teeth within the tooth insert assembly 106. Since the serrated teeth in tooth insert assembly 106 are offset, as described in tooth insert assembly 60, the elbow coupling 24 will have 600 positions of rotational adjustment with respect to the boom arm 20, as shown by arrow 111.

Figure 9:
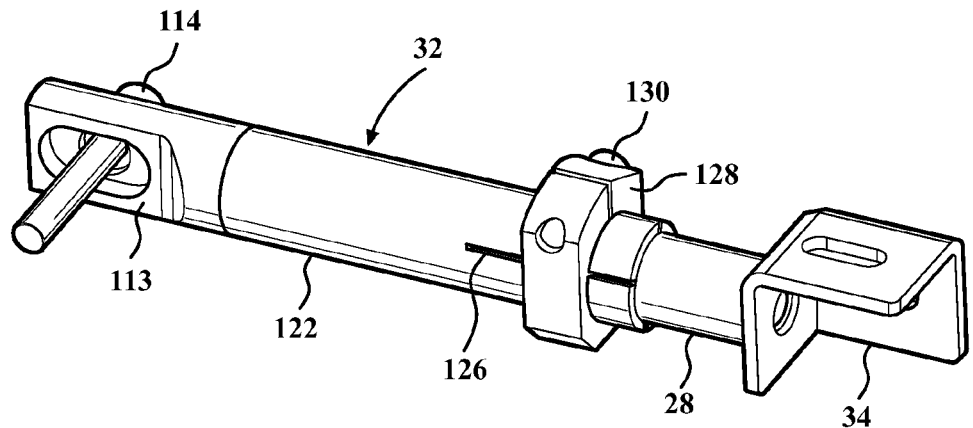
FIG. 9 is a perspective of the telescopic boom rod or the modular tooling apparatus of the present invention.

To connect the telescopic boom arm 32 to the elbow coupling 24, the opposite side of the elbow coupling 24 is connected to a tooth insert assembly 112 which is similar to the tooth insert assembly 60 previously described. Thus, the elbow coupling 24 provides a substantially oval recess that matingly receives a substantially oval projection provided on a first tooth insert of the tooth insert assembly 112. The tooth insert assembly 112 is connected to the boom arm 32 by the boom arm 32 having a substantially oval recess 113 that matingly receives a substantially oval projection on the second tooth insert of the tooth insert assembly 112, as seen in FIGS. 1-2 and 9. A conventional fastener 114 extends through a coaxial aperture extending through the end of the boom arm 32 and through the tooth insert assembly 112. The fastener 114 also extends and threads into a threaded aperture provided in the elbow coupling 24 in order to connect and secure the above listed elements. A spring 116 and a washer 118 may be assembled to the fastener 114 to bias the boom arm 32 toward the tooth insert assembly 112, as previously described in the similar configurations. By loosening the fastener 114, the serrated teeth in the tooth insert assembly 112 may be rotated relative to one another to allow for 600 rotational adjustments of the boom arm 32 relative to the elbow coupling 24, as shown by arrow 120.

To provide further linear and rotational adjustment of the modular tooling 12, the boom arm 32 may have a telescopic adjustment wherein a first portion 122 of the boom arm 32 receives a second portion of the boom arm 32, such as the shovel arm 28. The first portion 122 of the boom arm 32 has a substantially cylindrical configuration with slots 126 extending through the walls at one end of the first portion 122 of the boom arm 32. The slots 126 of the first portion 122 of the boom arm 32 allow the end of the first portion 122 to expand and receive the second portion of the boom arm 32, such as the shovel arm 28. A clamp 128 extends over the slotted portion of the first portion 122 of the boom arm 32. A conventional fastener 130 extends through apertures provided in a clamp 128 so as to releasably secure the second portion of the boom arm 32, such as the shovel arm 28, within the first portion 122 of the boom arm 32. When the clamp 128 is loosened by loosening the fastener 130, the second portion of the boom arm 32, such as the shovel arm 28, may be rotated or adjusted linearly along the longitudinal axis of the boom arm 32. The shovel 34 is connected to the end of the second portion of the boom arm 32, such as the shovel arm 28, through the use of a conventional fastener 132. As previously noted, any form of modular tooling 12 may be connected to the boom arm 32. Thus, the telescopic feature of the boom arm 32 allows for linear adjustment, as shown by arrow 134, and rotational adjustment, as shown by arrow 136, along and about the longitudinal axis of the boom arm 32.

Figure 10:
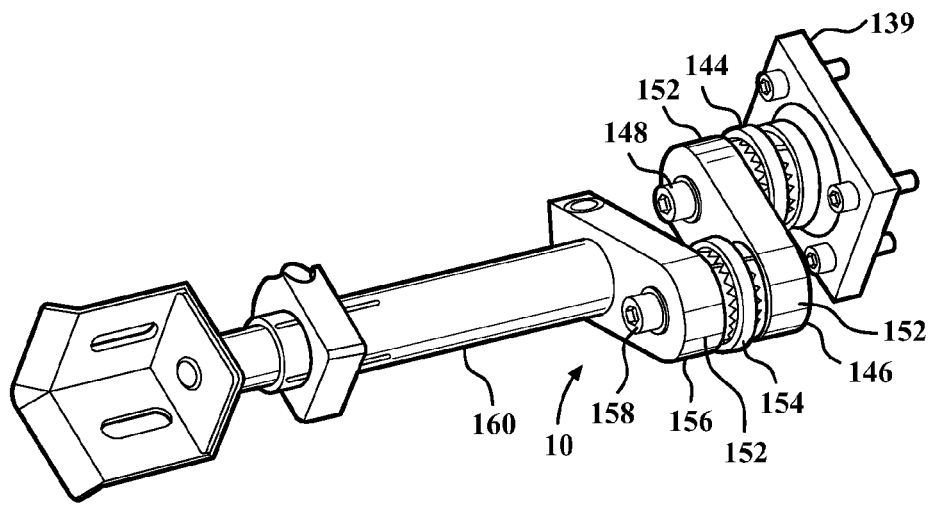
FIG. 10 is a perspective view of a second embodiment of the present invention showing an orbital adjustment of the modular tooling apparatus connected to a flange mount.
Figure 11:
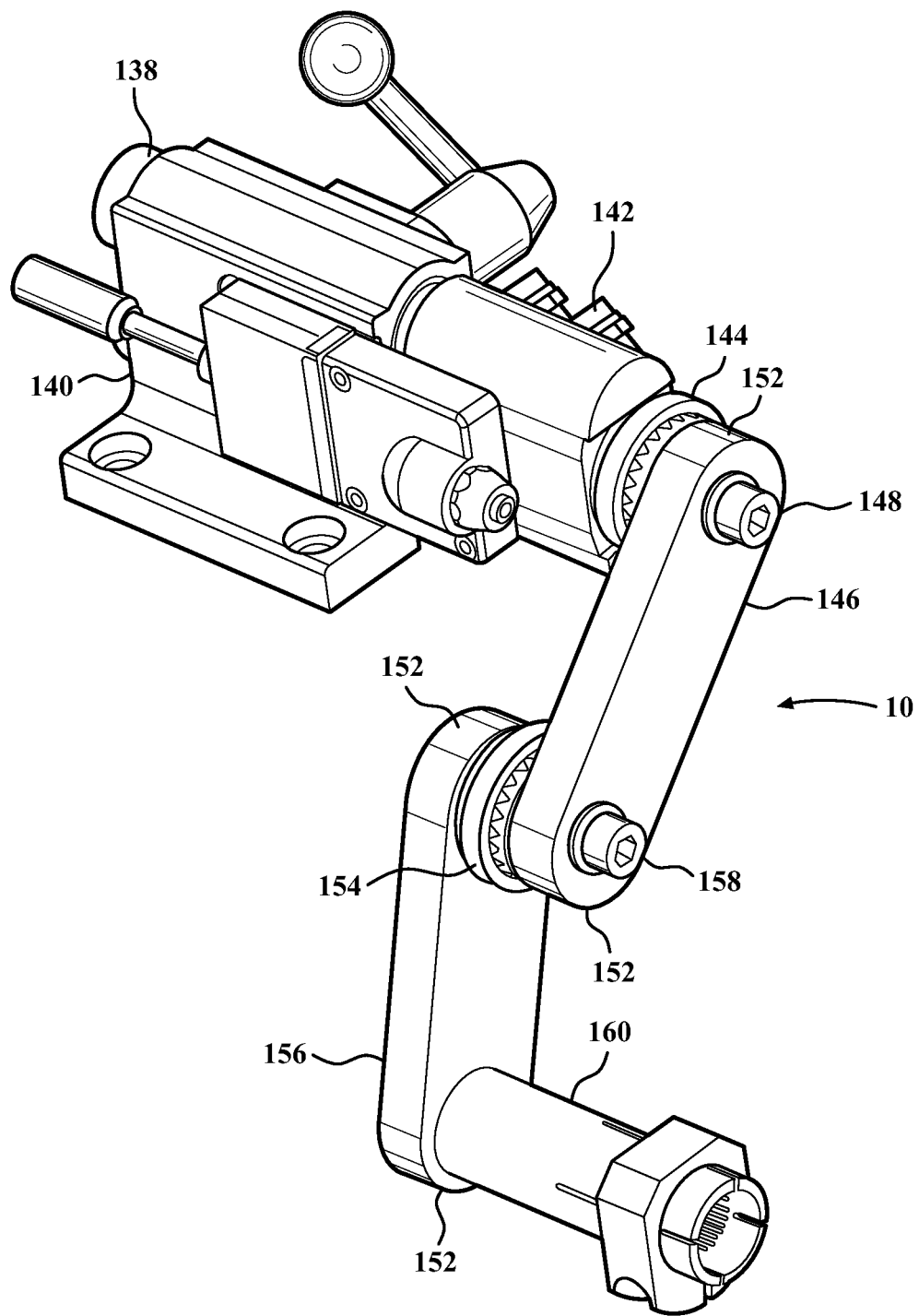
FIG. 11 is a perspective view of the second embodiment of the present invention showing an orbital adjustment of the modular tooling apparatus connected to a quick disconnect.
Figure 12:
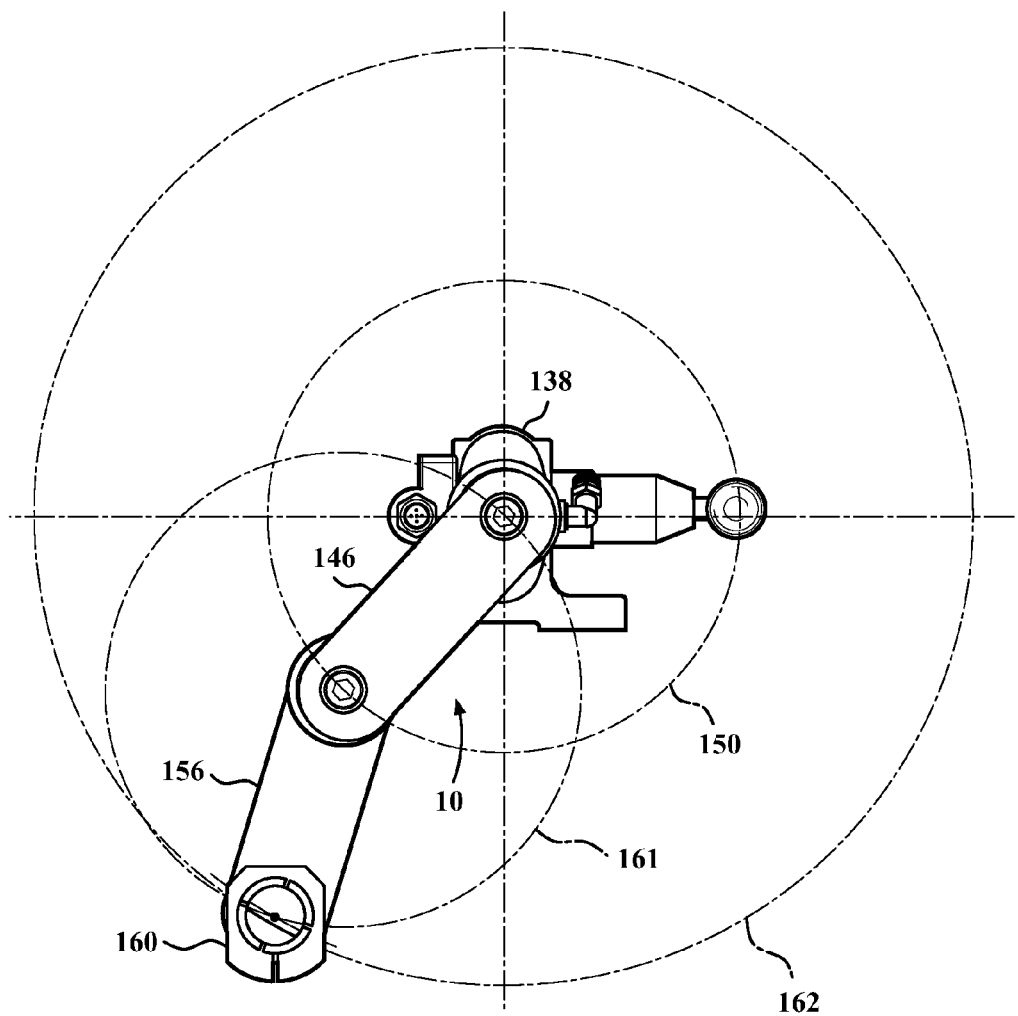
FIG. 12 is a front plan view of the second embodiment of the present invention showing the orbital adjustment of the modular tooling apparatus.

In another embodiment, the tooth insert assembly 60, as previously described, may be utilized to provide multiple orbital adjustments of the modular tooling apparatus 10. As seen in FIGS. 11-12, a quick disconnect 138 may be connected to a manipulator (not shown), such as a robotic arm or transfer rail/beam, or the modular tooling apparatus 10 may be connected to a manipulator by a flange mount 139, as seen in FIG. 10. As seen in FIGS. 11-12, the quick disconnect 138 has a female portion 140 that is connected to the manipulator through the use of conventional fasteners. A male portion 142 of the quick disconnect 138 is received by the female portion 140 of the quick disconnect 138. The quick disconnect 138 may provide pneumatic and electrical connections between the female and male portions 140, 142 of the quick disconnect 138.

To connect the modular tooling apparatus 10 to the quick disconnect 138, as seen in FIGS. 11-12, or to the flange mount 139 as seen in FIG. 10, a tooth insert assembly 144, similar to the tooth insert assembly 60 previously described, is connected to the end of the male portion 142 of the quick disconnect 138 or to the flange mount 139. The male portion 142 of the quick disconnect 138, as seen in FIGS. 11-12, and the flange mount 139, as seen in FIG. 10, both have a substantially oval recess for receiving a substantially oval projection extending from a first tooth insert of the tooth insert assembly 144. The tooth insert assembly 144 is also connected to linkage bar 146 through the use of a conventional fastener 148. The fastener 148 extends through a coaxial aperture extending through the linkage bar 146, the tooth insert assembly 144, and the male portion 142 of the quick disconnect 138 of the flange mount 139. Both the male portion 142 of the quick disconnect 138 and the flange mount 139 have threaded apertures for threadingly receiving the fastener 148. A spring (not shown) and a washer (not shown) may also be connected to the fastener 148, as previously described in a similar construction, so as to bias the linkage bar 146 toward the tooth insert assembly 144. By loosening the fastener 148, the tooth insert assembly 144 may be rotated to provide orbital adjustment of the linkage bar 146, as shown by the rotational axis 150 in FIG. 12, relative to the male portion 142 of the quick disconnect 138. Since the serrated teeth of the tooth insert assembly 144 are offset as described in the tooth insert assembly 60, the linkage bar 146 will have 600 incremental rotational adjustments relative to the quick disconnect 138 or flange mount 139.

The linkage bar 146 has a substantially rectangular configuration with rounded ends 152 at each end of the linkage bar 146. Opposite the first end of the linkage bar 146 is a second end that is connected to a tooth insert assembly 154 which is similar to the tooth insert assembly 60. That is, the linkage bar 146 has a substantially oval recess for matingly receiving a substantially oval projection on a first tooth insert on the tooth insert assembly 154. The tooth insert assembly 154 connects the linkage bar 146 to a second similar linkage bar 156 having a similar configuration to that of the linkage bar 146. That is, the linkage bar 156 has a substantially oval recess for receiving a substantially oval projection on a second tooth insert of the tooth insert assembly 154. A conventional fastener 158 extends through a coaxial aperture extending through the linkage bar 146, the tooth insert assembly 154, and a first end of the linkage bar 156 where the fastener 158 threads into a threaded aperture provided in the first end linkage bar 156. A spring (not shown) and a washer (not shown) may also be assembled to the fastener 158, as previously described in similar configurations, wherein the linkage bar 156 is biased toward the tooth insert assembly 154. When the fastener 158 is loosened, the serrated teeth of the tooth insert assembly 154 may be rotated to provide 600 orbital adjustments of the linkage bar 156 relative to the linkage bar 146 due to the offset serrated teeth in the tooth insert assembly 154, as previously described in the tooth insert assembly 60.

In order to provide orbital rotational and linear adjustment to the modular tool 12, a second end of the linkage bar 156, which is opposite the first end of the linkage bar 156, may have a telescopic boom arm 160, as similarly described in the boom arm 32, connected to the end of the linkage bar 156. The second end of the linkage bar 156 has a substantially oval recess that receives a substantially oval projection provided on the boom arm 160. A fastener extends through the second end of the linkage bar 156 and is threaded into a threaded aperture in the boom arm 160 to secure the boom arm 160 to the linkage bar 156. Thus, the linkage bar 156, in combination with the linkage bar 146, may allow for orbital adjustment of the modular tooling 12, as shown in radial axes 161 and 162 of FIG. 12. The telescopic boom arm 160 also provides linear and rotational adjustment of the modular tool 12, as previously described with the similar telescopic boom arm 32.

Figure 13:
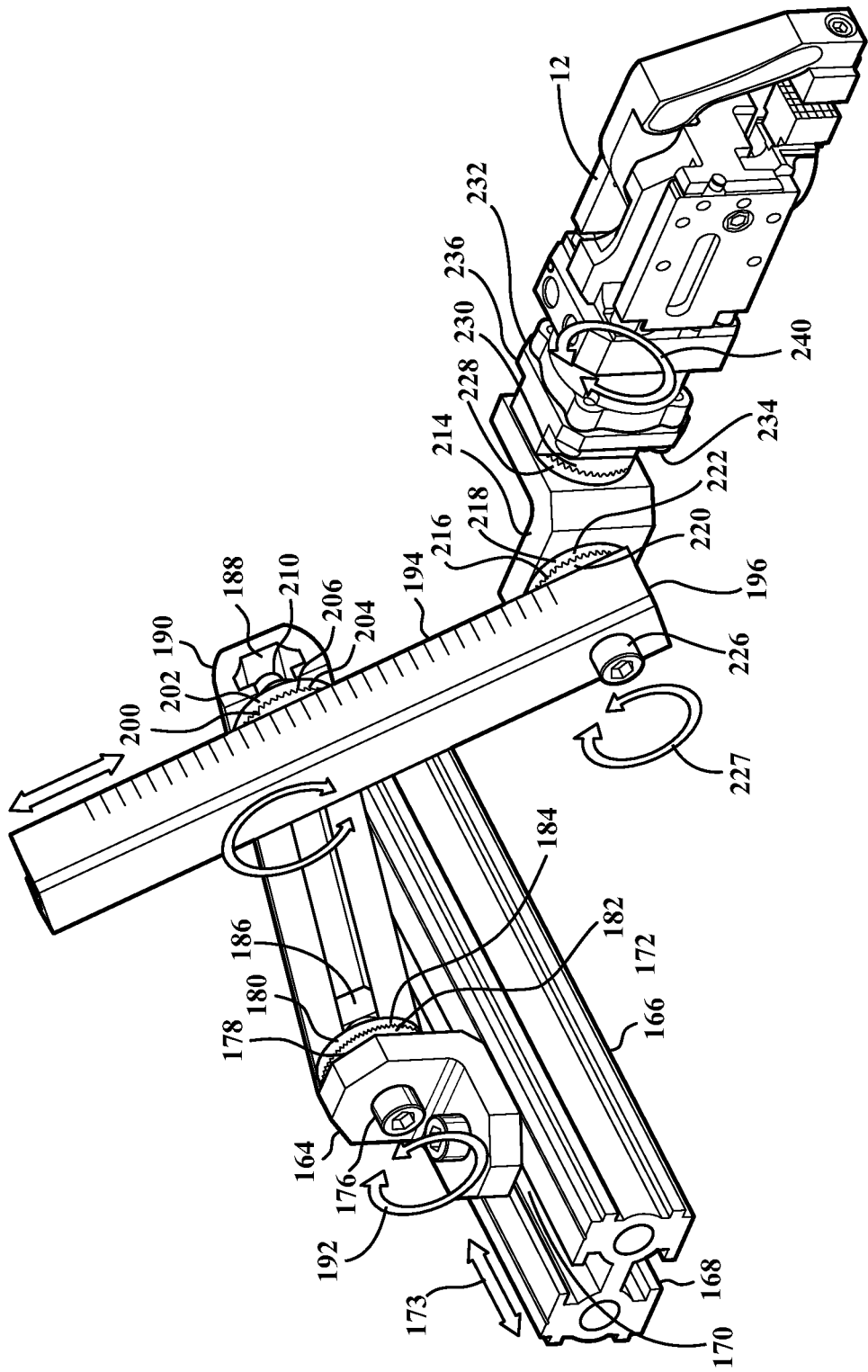
FIG. 13 is a perspective view of a third embodiment of the modular tooling apparatus of the present invention having orbital and linear adjustment.
Figure 14:
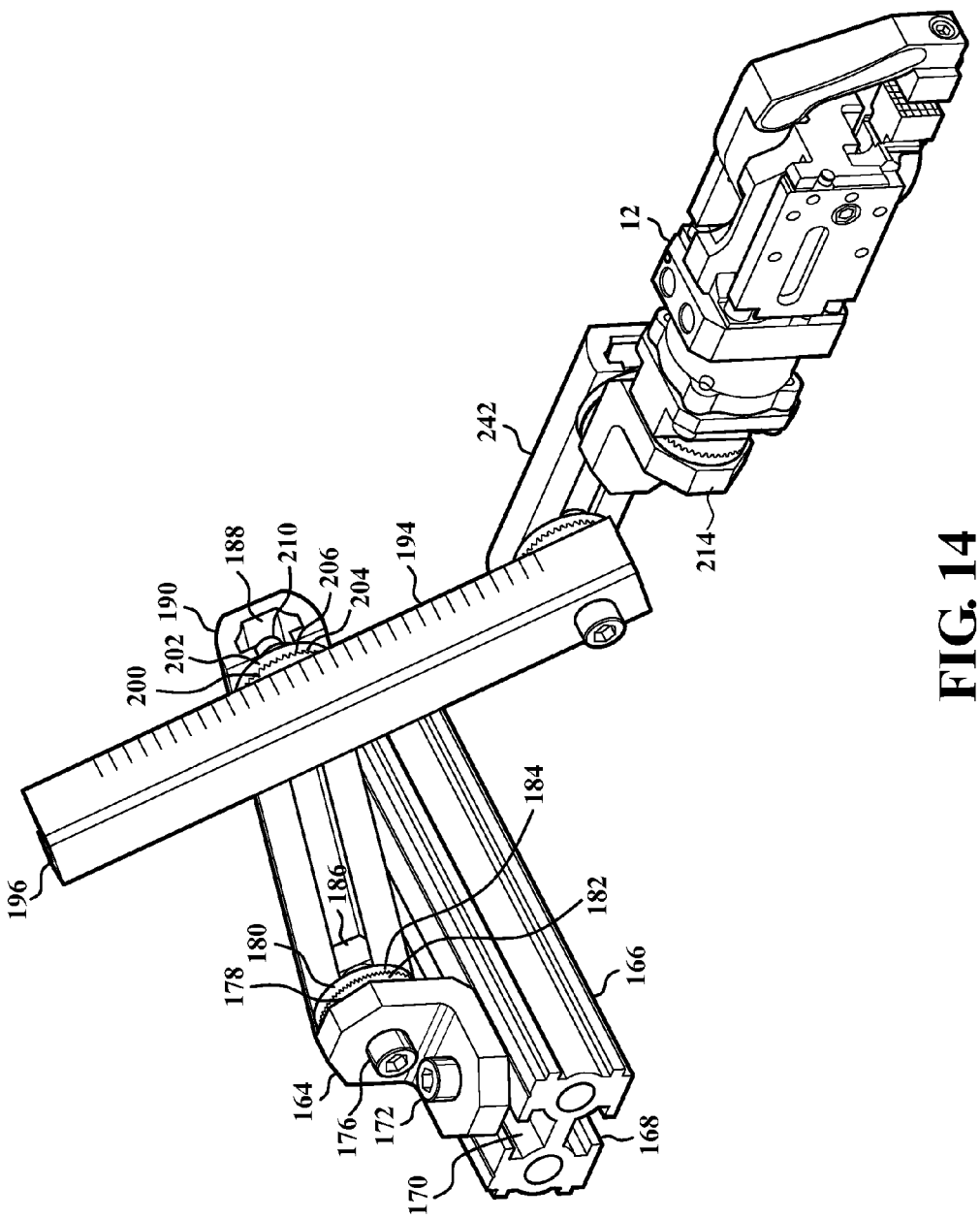
FIG. 14 is a perspective view of a fourth embodiment of the modular tooling apparatus of the present invention having orbital and linear adjustment.

In yet another embodiment, the modular tooling apparatus 10 provides a method for providing linear and orbital adjustment of the modular tooling 12, as seen in FIGS. 13 and 14. The modular tooling apparatus 10 provides a 90° elbow bracket 164 that is releasably and adjustably connected to a mounting rail 166. The mounting rail 166 provides a substantially T-shaped slot 168 for receiving a substantially T-shaped slide 170. The T-shaped slide 170 is captured within the T-shaped slot 168 of the mounting rail 166 such that the T-shaped slide 170 may slide along the T-shaped slot 168 of the mounting rail 166. A conventional fastener 172 extends through an aperture provided in the 90° elbow bracket 164 and threads into a threaded aperture provided in the T-shaped slide 170. The 90° elbow bracket 164 extends across the opening created by the T-shaped slot 168 in the mounting rail 166 such that when the fastener 172 is threaded into the threaded aperture of the T-shaped slide 170, the T-shaped slide 170 and the 90° elbow bracket 164 tighten against the mounting rail 166 so as to secure the 90° elbow bracket 164 in a stationary position relative to the mounting rail 166. Thus, when the fastener 172 is loosened, the 90° elbow bracket 164 may be adjusted linearly along the longitudinal axis of the mounting rail 166 by sliding the T-shaped slide 170 along the mounting rail 166, as shown by arrow 173.

The other end of the 90° elbow bracket 164 extends outward away from the mounting rail 166 and has an aperture extending there through for receiving a fastener 176. The fastener 176 also extends through a pair of substantially circular disks 178, 180 having opposing and mating serrated teeth 182, 184 formed in a substantially circular configuration on each of the circular disks 178, 180. The fastener 176 extends through coaxial apertures extending through the 90° elbow bracket 164 and through apertures provided in each of the circular disks 178, 180. The fastener 176 also extends into a substantially T-shaped slide 186 that is slidably captured within a substantially T-shaped slot 188 formed in a substantially rectangular linkage rail 190. When the fastener 176 is threaded into a threaded aperture in the T-shaped slide 186, the T-shaped slide 186 and the circular disks 178, 180 tighten against the linkage rail 190 so as to secure the 90° elbow bracket 164 in a fixed position relative to the linkage rail 190. However, when the fastener 176 is loosened, the T-shaped slide 186 is allowed to move linearly along the linkage rail 190, and the circular disks 178, 180 are allowed to rotate relative to one another so as to allow the linkage rail 190 to rotate relative to the mounting rail 166, as indicated by arrow 192. Although the circular disks 178, 180 do not include a spacer having serrated teeth there between, it should be known that the present invention anticipates using a tooth insert assembly 60 in the present embodiment, as previously described.

In order to provide further adjustment of the modular tooling 12, the modular tooling apparatus 10 provides an additional linkage rail 194 that is similar to the linkage rail 190. The linkage rail 194 also provides a T-shaped slot 196 and a substantially T-shaped slide (not shown) similar to that previously described in the linkage rail 190. A pair of circular disks 200, 202, similar to disks 178, 180, between the linkage rails 190, 194 are also provided with each disk 200, 202 having a circular array of serrated teeth 204, 206. The circular disk 200 is mounted adjacent the T-shaped slide provided in the linkage rail 194, and the circular disk 202 is mounted adjacent the T-shaped slot 188 of the linkage rail 190. A conventional fastener 210 extends coaxially through apertures provided in the T-shaped slide 208, the circular disks 200, 202, and the substantially T-shaped slide 198 provided in the linkage rail 194. There is no T-shaped slide provided in the linkage rail 190 because the fastener 210 must extend through the linkage rail 190 to provide access to the fastener 210; therefore, the disks 200, 202 cannot move linearly along the linkage rail 190. However, when the fastener 210 is loosened, the T-shaped slide may slide along the linkage rail 194 to provide linear adjustment along the linkage rail 194, as indicated by the linear arrow. The circular disks 200, 202 may also rotate relative to one another thereby providing rotational or orbital adjustment of the linkage rail 194 relative to the linkage rail 190, as indicated by arrow 212. When the fastener 210 is tightened, the circular disks 200, 202 and substantially T-shaped slides 198, 208 are secured in a fixed position relative to the linkage rails 194, 190. However, since the fastener 210 must pass through an aperture provided in a wall of the linkage rail 190 in order to provide the user with access to the fastener 210, the linkage rail 194 cannot be adjusted linearly along the linkage rail 190.

To secure the modular tooling 12 to the linkage rail 194, a 90° elbow bracket 214 is utilized at one end of the linkage rail 194, as seen in FIG. 13. The 90° elbow bracket 214 has a pair of circular disks 216, 218 mounted between the 90° elbow bracket 214 and the linkage rail 194. Each of the circular disks 216, 218 have a circular array of mating serrated teeth 220, 222 similar to the disks 178, 180. The circular disk 218 is mounted adjacent a substantially T-shaped slot 196 provided in the linkage rail 194. A conventional fastener 226 extends coaxially through an aperture provided in the linkage rail 194, through the T-shaped slide 224, the circular disks 216, 218, and the 90° elbow bracket 214. Again, no T-shaped slide is utilized due to the fastener 226 extending through the linkage rail 194. However, when the fastener 226 is loosened, the circular disks 216, 218 may rotate relative to one another thereby providing rotational adjustment of the modular tooling 12 relative to the linkage rail 194, as indicated by arrow 227. When the fastener 226 is tightened, the circular disks 216, 218 are brought together to allow the serrated teeth 220, 222 of the circular disks 216, 218 to mate, thereby securing the 90° elbow bracket 214 in a stationary position relative to the linkage rail 194.

To provide rotational adjustment to the modular tool 12, an opposite end of the 90° elbow bracket 214 provides a substantially circular disk 228 having a circular array of serrated teeth 230 formed thereon. The modular tool 12 has a mounting bracket 232 connected to the modular tool 12 by four conventional fasteners 234. The mounting bracket 232 also has a circular array of serrated teeth 236 mounted thereon for matingly engaging the serrated teeth 230 provided on the circular disk 228 of the 90° elbow bracket 214. A conventional fastener (not shown) extends coaxially through an aperture provided in the 90° elbow bracket 214, the circular disk 228, and the mounting bracket 232. When the fastener is loosened, the serrated teeth 230, 236 may be allowed to rotate relative to one another to provide for rotational adjustment of the modular tool 12, as indicated by an arrow 240. When the fastener 238 is tightened, the serrated teeth 230, 236 are matingly secured against one another thereby allowing the modular tool 12 to be maintained in a stationary position relative to the 90° elbow bracket.

In an alternative embodiment shown in FIG. 14, an additional linkage rail 242 may be connected to the linkage rail 194 before connecting the 90° elbow bracket 214 to the modular tool 12. The same construction as linkage rails 190 and 194 is utilized to provide the modular tooling apparatus with an additional degree of orbital and linear adjustment of the modular tool.

Figure 15:
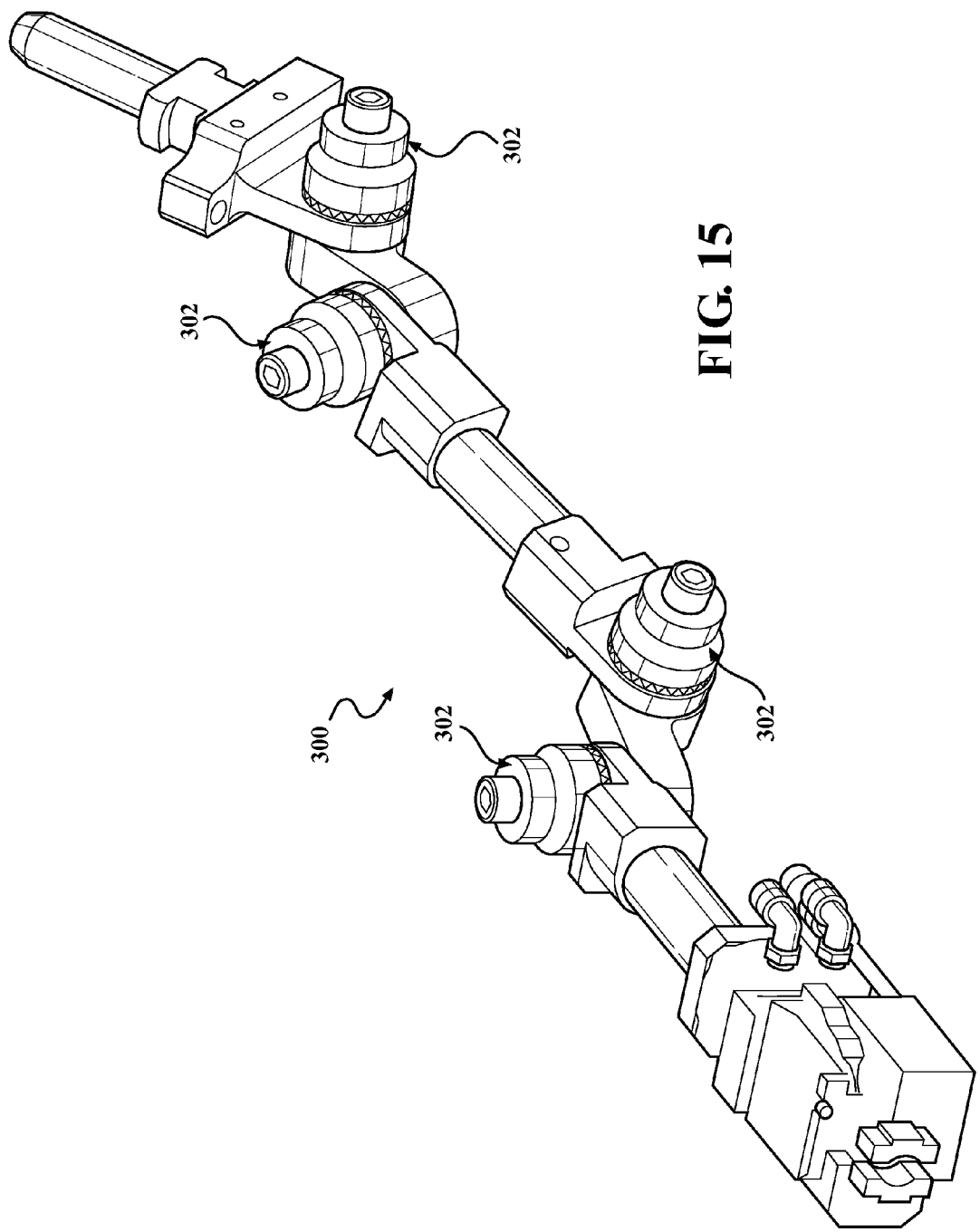
FIG. 15 is a perspective view of a fifth embodiment of the modular tooling apparatus of the present invention having a locking cap assembly.

In another embodiment of the of the present invention, the tooth insert assembly 60 can be replaced in a modular tooling apparatus 300 by a locking cap assembly 302, as shown in FIG. 15. In the modular tooling apparatus 300, the locking cap assembly 302 may be utilized to assist in connecting the modular tool 12 to a quick disconnect, as similarly described in previous embodiments, while providing orbital and rotational adjustment of the modular tool 12. The locking cap assembly 302 is similar to the tooth insert assembly 60 in that two sets of contoured surfaces having serrated teeth with different number of teeth are employed to achieve fine positional control and ease of adjustment of the locking cap assembly 302; however, the methods of adjustment are different from those of the tooth insert assembly 60.

Figure 16:
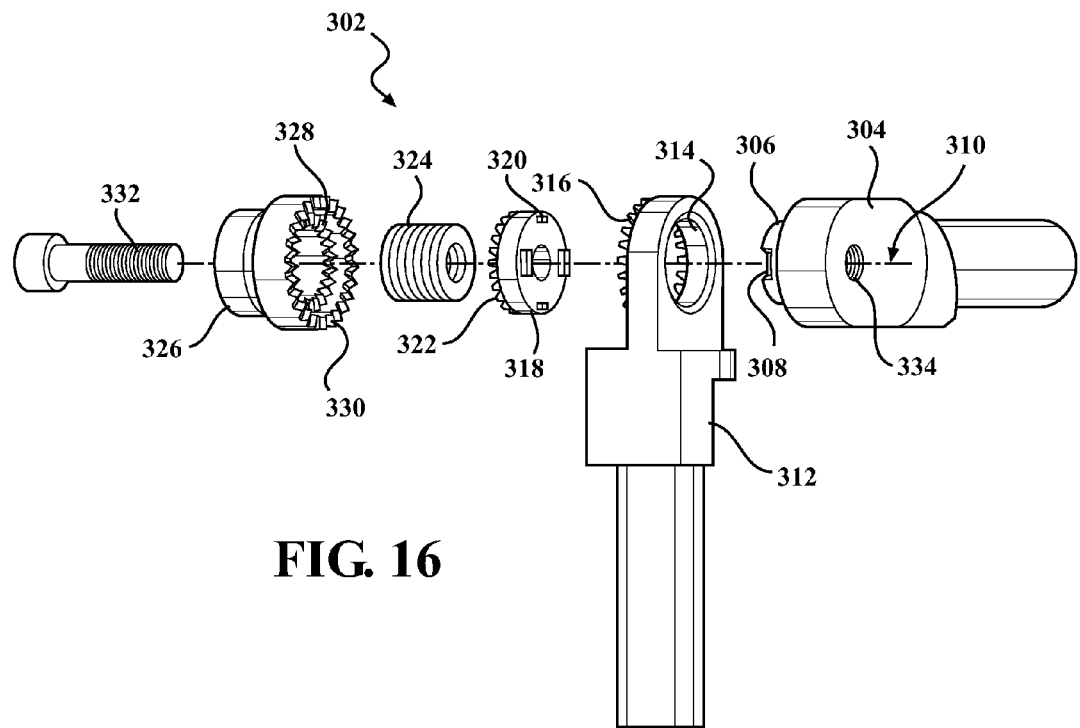
FIG. 16 is a right sided exploded view of the fifth embodiment of the modular tooling apparatus of the present invention having a locking cap assembly.
Figure 17:
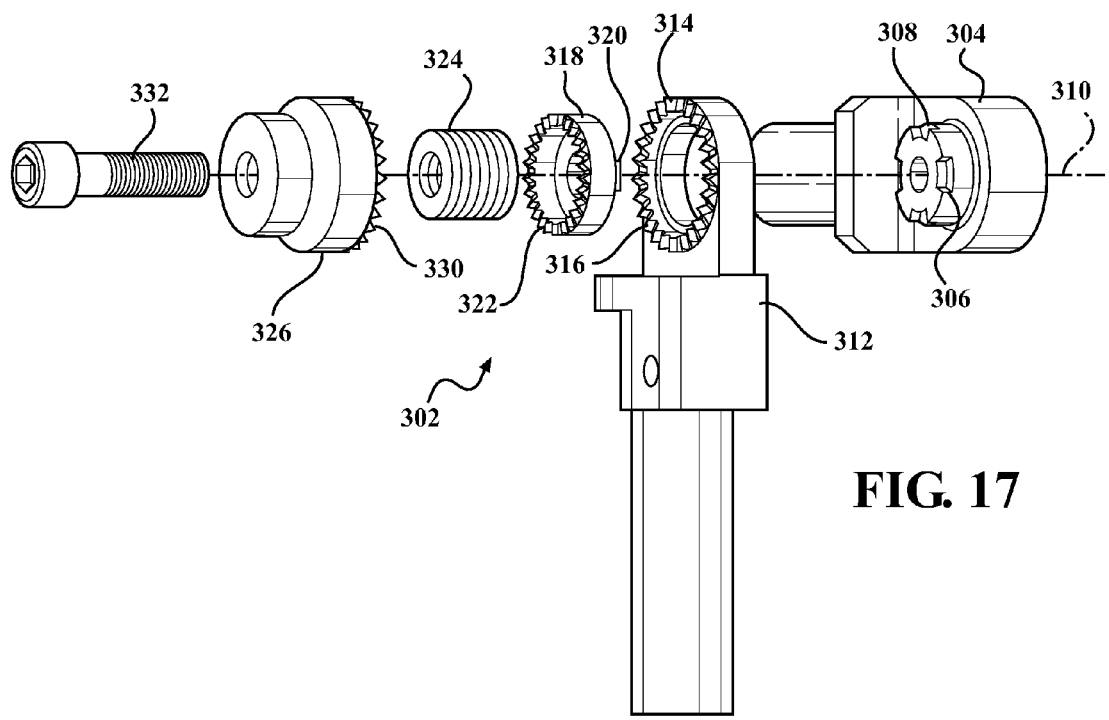
FIG. 17 is a left sided exploded view of the fifth embodiment of the modular tooling apparatus of the present invention having a locking cap assembly.

FIGS. 16 and 17 show exploded views of the locking cap assembly 302, which includes a mounting member or base coupling 304 having a substantially cylindrical extension 306 having a face with four slots 308 formed therein along a longitudinal axis 310. The mounting member 304 may be connected to a boom rod, coupling, and/or quick disconnect which in turn is connected to a manipulator. The locking cap assembly 302 also includes a moveable member 312 which in turn is connected to the modular tool 12. The moveable member 312 has an aperture 314 extending there through for rotatably receiving the cylindrical extension 306 of the mounting member 304. The moveable member 312 has a contoured surface having serrated teeth 316 radially formed therein in a substantially cylindrical manner. The mounting member 304 also has a substantially cylindrical base member 318 having four tabs 320 formed on one end of the base member 318 that matingly engage the slots 308 of the cylindrical extension 306 of the mounting member 304 in a fixed relationship. The base member 318 is also partially received within the aperture 314 provided in the moveable member 312. The base member 318 also has a contoured surface having serrated teeth 322 radially formed in a substantial cylindrical configuration and extending from the opposite end of the base member 318 from the tabs 320. The serrated teeth 322 of the base member 318 fit within the serrated teeth 316 of the moveable member 312 without interfering with its movement. The locking cap assembly 302 further includes a substantially cylindrical locking cap or locking member 326 having one contoured surface of serrated teeth 328 and a second contoured surface of serrated teeth 330 formed on one end of the locking cap 326. The serrated teeth 328, 330 are radially formed therein in a substantial cylindrical manner and are coaxially aligned and concentric with one another wherein serrated teeth 330 has a larger diameter than serrated teeth 328. The locking cap 326 is releasably engageable to locking cap assembly 302 by a conventional fastener 332 which passes through appropriately sized apertures in locking cap 326, spacers 324, moveable member 312 and base member 318 to be attached to a threaded aperture 334 in the mounting member 304 along the longitudinal axis 310.

To secure the locking cap assembly 302 and prevent the mounting member 304 from moving in relation to the moveable member 312, the fastener 332 is threaded into the threaded aperture 334 causing the locking cap 326 to engage the serrated teeth 328 on the locking cap 326 with the serrated teeth 322 of the base member 318 and engage the serrated teeth 330 of the locking cap 326 with the serrated teeth 316 of the moveable member 312. When the fastener 332 is tightened against the locking cap 326, the engagement of the first slots 308 and the second tabs 320, the serrated teeth 322, 328, and the serrated teeth 316, 330 prevent mounting member 304 from moving in relation to the moveable member 312.

To adjust the locking cap assembly 302 and change the geometric relationship between the mounting member 304 and the moveable member 312, the fastener 332 is threadingly loosened to permit disengagement of the serrated teeth 328 in the locking cap 326 from the serrated teeth 322 on the base member 318 and the serrated teeth 330 of the locking cap 326 from the serrated teeth 316 of the moveable member 312 without removing the fastener 332 completely from the threaded aperture 334. The mounting member 304 and the moveable member 312 are then free to move in relation to each other about the longitudinal axis 310. Adjustment can be accomplished by an operator manipulating the mounting member 304 and the moveable member 312 by hand to the desired position. The locking cap 326 can be then rotated about the longitudinal axis 310 to find a location where the serrated teeth 328 of the locking cap 326 can engage the serrated teeth 322 of the base member 318 and the serrated teeth 330 of the locking cap 326 can engage the serrated teeth 316 of the moveable member 312, simultaneously. This is possible since the combination of unequal numbers of serrated teeth on the contoured surfaces provides adjustment to within about 0.6 degrees by rotating the locking cap 326 with respect to the serrated teeth 322 of the base member 318 and the serrated teeth 316 of the moveable member 312. The locking cap assembly 302 can then fix the relative position of the mounting member 304 and the moveable member 312 in this position by threadingly tightening the fastener 332, thereby maintaining the adjusted relationship between the mounting member 304 and the moveable member 312.

Since the serrated teeth 328 of the locking cap 326 and the serrated teeth 322 of the base member 318 have a first number of teeth, and the serrated teeth 330 of the locking cap 326 and the serrated teeth 316 of the moveable member 312 have a second number of teeth, the angular resolution at which the locking cap assembly 302 can fix the moveable member 312 and the mounting member 304 is a function of the ratio of the first and second numbers of teeth. For example, if the serrated teeth 328, 322 have 24 teeth and the serrated teeth 330, 316 have 25 teeth, the angular resolution of the locking cap assembly 302 is about 0.6 degrees yielding 600 different positions at which the locking cap assembly 302 can be set within its 360° rotation. To find the correct position at which the serrated teeth 328, 330 of the locking cap 326 engage the serrated teeth 328 of the base member 318 and the serrated teeth 316 of the moveable member 312, the locking cap 326 is rotated until the best fit between the serrated teeth 328, 322, 330, 316 is found.

Different embodiments of the locking cap assembly 302 can also include a biasing element 329 which helps to maintain engagement of appropriate contoured surfaces during the adjustment process. Inclusion of springs through which the fastener 332 passes on the longitudinal axis 310 between the fastener 332 and the locking cap 326 can cause the locking cap 326 to be biased against the moveable member 312 and the base member 318 unless a user is actively disengaging the locking cap 326.

Figure 18:
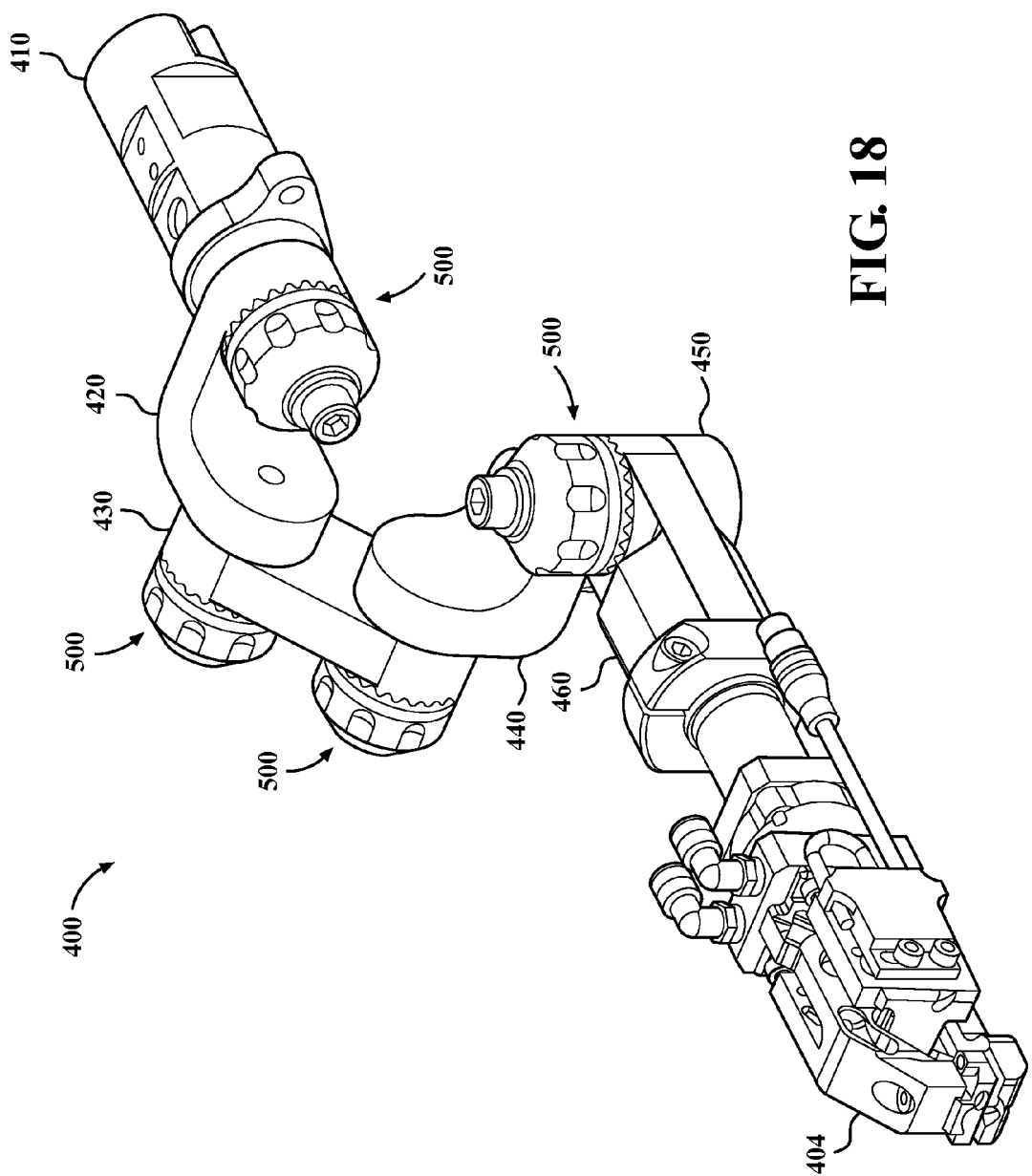
FIG. 18 is a perspective view of a modular tooling apparatus according to a sixth embodiment.

An example of a modular tooling apparatus 400 according to a further embodiment is shown in FIG. 18. The modular tooling apparatus 400 can provide orbital, rotational, and/or linear spatial adjustments to at least one conventional modular tool, such as a powered gripper 402, that is connected to the modular tooling apparatus 400.

The modular tooling apparatus 400 can include a male quick disconnect coupler 410 of a quick disconnect assembly (not shown) which in turn may be received by a female quick disconnect coupler (not shown) of the quick disconnect assembly. The female quick disconnect coupler of the quick disconnect assembly can be connected to a manipulator, such as a robotic arm or a movable tooling rail (not shown).

The modular tooling apparatus 400 can also include a plurality of links that are rotationally, orbitally, and/or linearly adjustable with respect to one another. In the illustrated example, the modular tooling apparatus includes a first elbow link 420, a first straight link 430, a second elbow link 440, a second straight link 450, an end link 460, and a boom arm 470 that is telescopically related to the end link 460 and secured to the end link 460 by a clamping collar 480. The boom arm 470 is connected to the modular tool, such as the powered gripper 402.

Adjacent pairs of the various members of the modular tooling apparatus 400 are connected to each other. In the illustrated example, the male quick disconnect coupler 410, the first elbow link 420, the first straight link 430, the second elbow link 440, the second straight link 450 and the end link 460 are each connected to at least one adjacent structure by a rotationally adjustable locking joint 500. As will be explained herein, each of the rotationally adjustable locking joints 500 is defined in part by structures that are formed on the members that are connected to each other.

Figure 19:
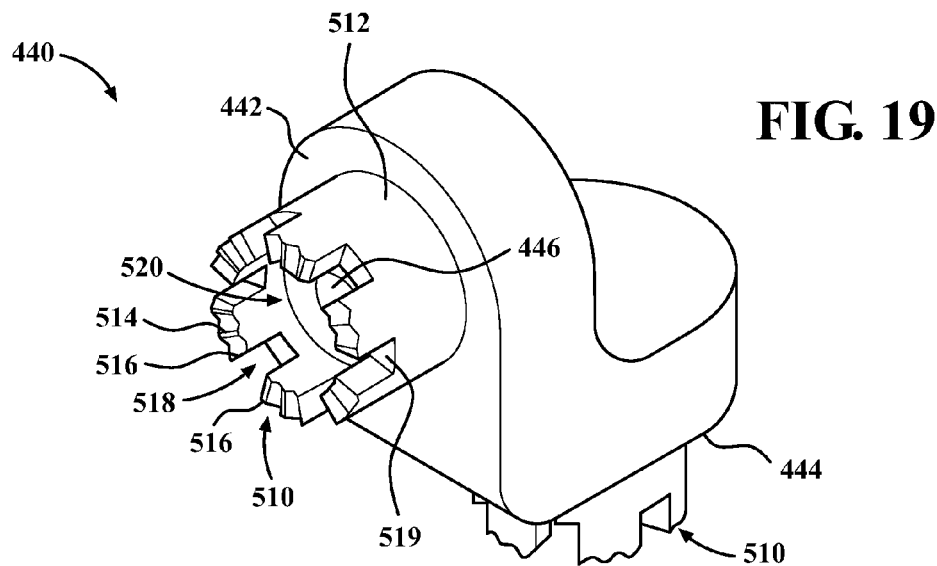
FIG. 19 is a perspective view showing an elbow link of the modular tooling apparatus according to the sixth embodiment.

FIG. 19 shows the second elbow link 440 of the modular tooling apparatus. The second elbow link 440 includes a first surface 442 and a second surface 444 that are oriented perpendicularly with respect to one another. The second elbow link 440 includes two male coupling structures 510, each formed on a respective one of the first surface 442 and the second surface 444. The male coupling structures 510 can each form part of one of the adjustable locking joints 500 of the modular tooling apparatus 400, as will be explained further herein.

The male coupling structure 510 of each locking joint 500 includes a substantially cylindrical wall 512 that extends outward from a surface of the member that it is formed on, such as the first surface 442 of the second elbow link 440. A contoured surface is formed on the axial end of the cylindrical wall 512. In particular, the contoured surface can be defined by a plurality of teeth 514 that are formed on radially separated fingers 516 that are defined by the cylindrical wall 512. The radially separated fingers 516 can extend in the axial direction of the cylindrical wall 512. The teeth 514 can be formed at a constant radial spacing with respect to one another on each of the radially separated fingers 516, which are spaced apart from one another by a plurality of slots 518, each of which extends through a portion of the substantially cylindrical wall 512, for example, from the axial end of the cylindrical wall 512 to a slot end 519 at an intermediate location on the cylindrical wall 512 between the axial end and the surface of the member on which the male coupling structure 510 is formed. The cylindrical wall 512 can define a hollow interior 520 for the male coupling structure 510, and the hollow interior 520 can be adjacent to an aperture that is formed through the member on which the male coupling structure 510 is formed. For example, the second elbow link 440 can include an aperture 446. As will be discussed further herein, the aperture 446 can be a threaded aperture that is adapted to receive and engage a threaded fastener.

Figure 20:
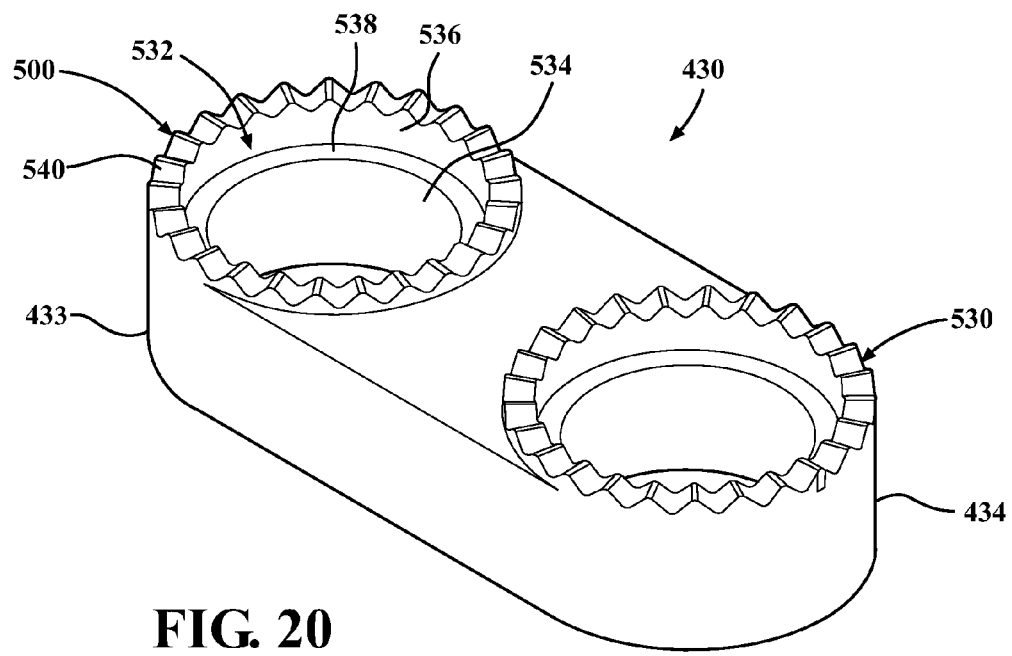
FIG. 20 is a perspective view showing a straight link of the modular tooling apparatus according to the sixth embodiment.

FIG. 20 shows the first straight link 430 of the modular tooling apparatus 400. The first straight link 430 extends from a first end 433 to a second end 434. The first straight link 430 includes two female coupling structures 530, each of which is formed on the first straight link 430 adjacent to a respective one of the first end 433 or the second end 434 of the first straight link 430. The female coupling structures 530 can each form part of one of the adjustable locking joints 500 of the modular tooling apparatus 400, as will be explained further herein.

The female coupling structure 530 of each locking joint includes a bore 532 that extends through the member on which the female coupling structure 530 is formed, such as the first straight link 430 of the modular tooling apparatus 400. The bore 532 can be a stepped bore that is defined by a first radial wall portion 534 and a second radial wall portion 536 that meet at a shoulder 538, wherein the bore 532 has a smaller diameter in the portion defined by the first radial wall portion 534 than it does in the portion defined by the second radial wall portion 536. The female coupling structure 530 includes a contoured surface that extends outward from a surface on the member that the female coupling structure 530 is formed on, such as a first surface 432 of the first straight link 430. In particular, the contoured surface can be defined by a plurality of teeth 540 that extend outward with respect to the first surface 432 of the first straight link 430 and surround the bore 532 of the female coupling structure 530, such that the contoured surface defined by the plurality of teeth 540 is substantially annular. Furthermore, the contoured surface defined by the plurality of teeth 540 can be substantially continuous. The plurality of teeth 540 of the contoured surface of the female coupling structure 530 can be arranged with a constant radial spacing. In addition, the radial spacing of the plurality of teeth 540 of the contoured surface of the female coupling structure 530 can be different than the radial spacing of the plurality of teeth 514 of the male coupling structure 510, in order to allow positional adjustment of the female coupling structure 530 with respect to the male coupling structure 510, as will be explained in detail further herein.

Figure 21:
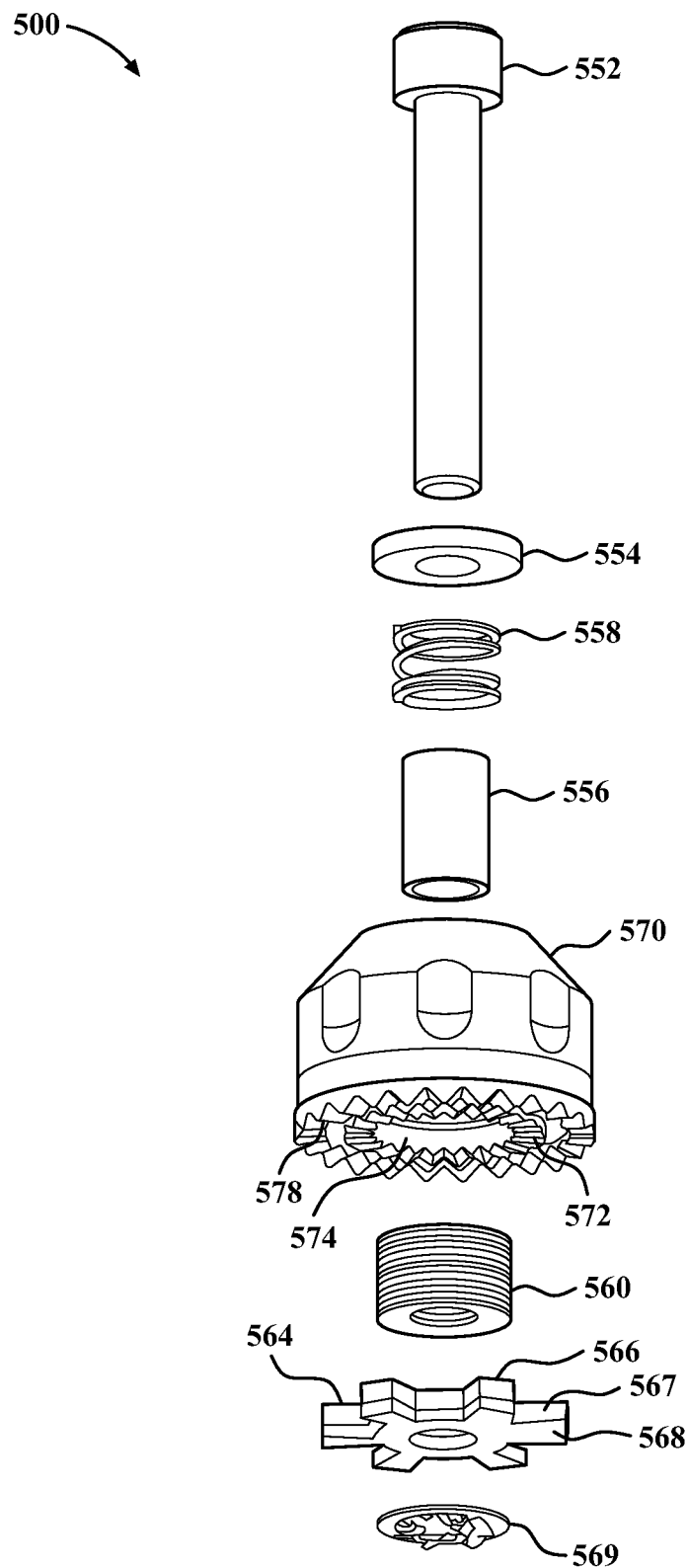
FIG. 21 is an exploded view showing a locking cap assembly of the modular tooling apparatus according to the sixth embodiment.

As shown in FIG. 21, each of the rotationally adjustable locking joints 500 includes a locking member such as a locking cap assembly 550. The locking cap assembly 550 includes a connecting rod 552, which can be in the form of a threaded fastener. For example, in one implementation, the connecting rod 552 can be a cap bolt. The locking cap assembly 550 can also include a washer 554, a sleeve 556, a first biasing element 558, such as a compression spring, and a second biasing element 560, such as a stack of Belleville washers, all of which are received within a locking cap 570. The locking cap assembly 550 can also include an engaging structure 580 that is connected to the connecting rod 552 by a fastener 562. As examples, the fastener 562 can be a locking washer or a toothed washer.

The locking cap 570 includes a first contoured surface or inner contoured surface that is defined by a first plurality of teeth 572. The first plurality of teeth 572 are arranged radially around a first bore portion 574 that extends axially through the locking cap 570. A second bore portion 576 (FIGS. 22-23) is also defined by the locking cap 570 and extends axially through the locking cap 570 at an opposite end of the locking cap 570 with respect to the first bore portion 574. The first plurality of teeth 572 can be arranged continuously around the first bore portion 574 at a constant radial spacing. In particular, the contoured surface defined by the first plurality of teeth 572 can be complementary to the contoured surface defined on the male coupling structure 510 by the plurality of teeth 514 of the male coupling structure 510, such that the first contoured surface of the locking cap 570 is engageable with the contoured surface of the male coupling structure 510 to restrain rotation of the male coupling structure 510 with respect to the locking cap 570.

A second contoured surface or outer contoured surface is formed on the locking cap 570 by a second plurality of teeth 578, which are positioned radially outward from the first plurality of teeth 572 and at approximately the same axial location along the locking cap 570 as the first plurality of teeth 572. Thus, the second contoured surface that is defined by the second plurality of teeth 578 is configured as an annular structure that surrounds the first contoured surface that is defined by the first plurality of teeth 572. The second contoured surface that is defined by the second plurality of teeth 578 is complementary to the contoured surface of the female coupling structure 530 that is formed by the plurality of teeth 540 of the female coupling structure 530. The second contoured surface of the locking cap 570 is thus engageable with the contoured surface of the female coupling structure 530 to restrain relative rotation of the locking cap 570 with respect to the female coupling structure 530.

The locking cap assembly 550 also includes a friction member 564 that is received on the rod 552 and includes a plurality of radially extending fingers 566. The friction member 564 can, in some implementations, be a two layer structure that includes a rigid base layer 567 and a friction pad 568 that is affixed to the rigid base layer 567. A retainer 569, such as a lock washer, can be provided on the rod 552 to retain the friction member 564 one the rod 552.

Figure 22:
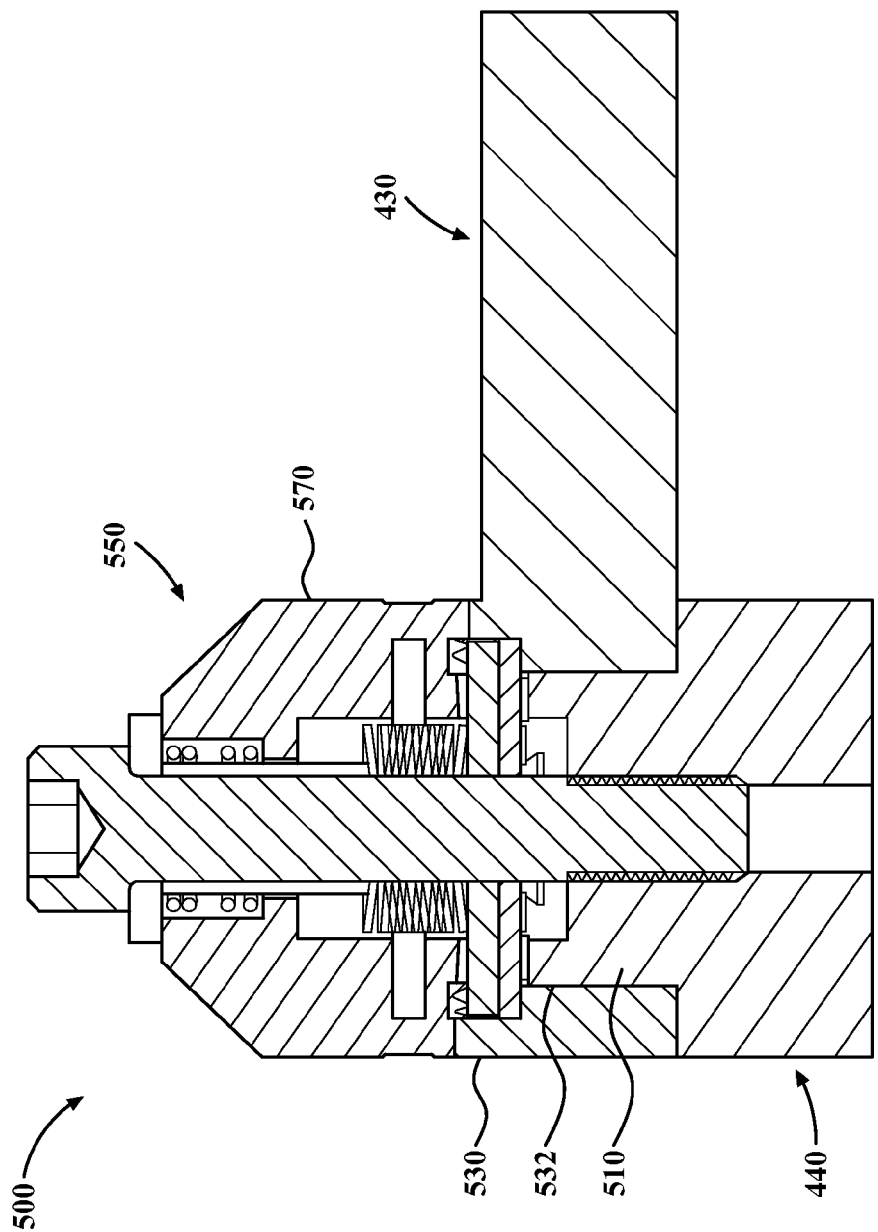
FIG. 22 is a cross-section view showing a rotationally adjustable locking joint of the modular tooling apparatus according to the sixth embodiment in a locked position.

FIG. 22 is a cross-sectional view showing one of the rotationally adjustable locking joints 500 in a locked position. The male coupling structure 510 is disposed within the bore 532 of the female coupling structure 530. Thus, the contoured surface that is defined by the teeth 514 of the male coupling structure 510 are positioned adjacent to, in axial alignment with, concentrically arranged with respect to, and radially inward from the contoured surface that is defined by the teeth 540 of the female coupling structure 530. In addition, the contoured surface that is defined by the teeth 514 of the male coupling structure 510 and the contoured surface that is defined by the teeth 540 of the female coupling structure 530 are oriented in a common direction, toward the locking cap 570 of the locking cap assembly 550.

In the locked position, the locking cap 570 of the locking cap assembly 550 engages the male coupling structure 510 and the female coupling structure 530 to restrain the male coupling structure 510 and the female coupling structure 530 from rotating with respect to one another. In particular, the contoured surface defined by the teeth 514 of the male coupling structure 510 engage the contoured surface defined by the first plurality of teeth 572 of the locking cap 570 and the contoured surface defined by the teeth 540 of the female coupling structure 530 engages the contoured surface defined by the second plurality of teeth 578 of the locking cap 570, thereby restraining the male coupling structure 510 and the female coupling structure 530 from rotating with respect to one another.

In order to secure the locking cap assembly 550 in the locked position with respect to the male coupling structure 510 and the female coupling structure 530, the rod 552 can extend through the locking cap 570, the male coupling structure 510, and the female coupling structure 530, and threadedly engage the second elbow link 440, such as by threaded engagement with the aperture 446, which can be complementarily threaded. Alternatively, the aperture 446 need not be threaded, and a fastener such as a nut (not shown) can be used to secure the rod 552 with respect to the second elbow link 440.

Figure 23:
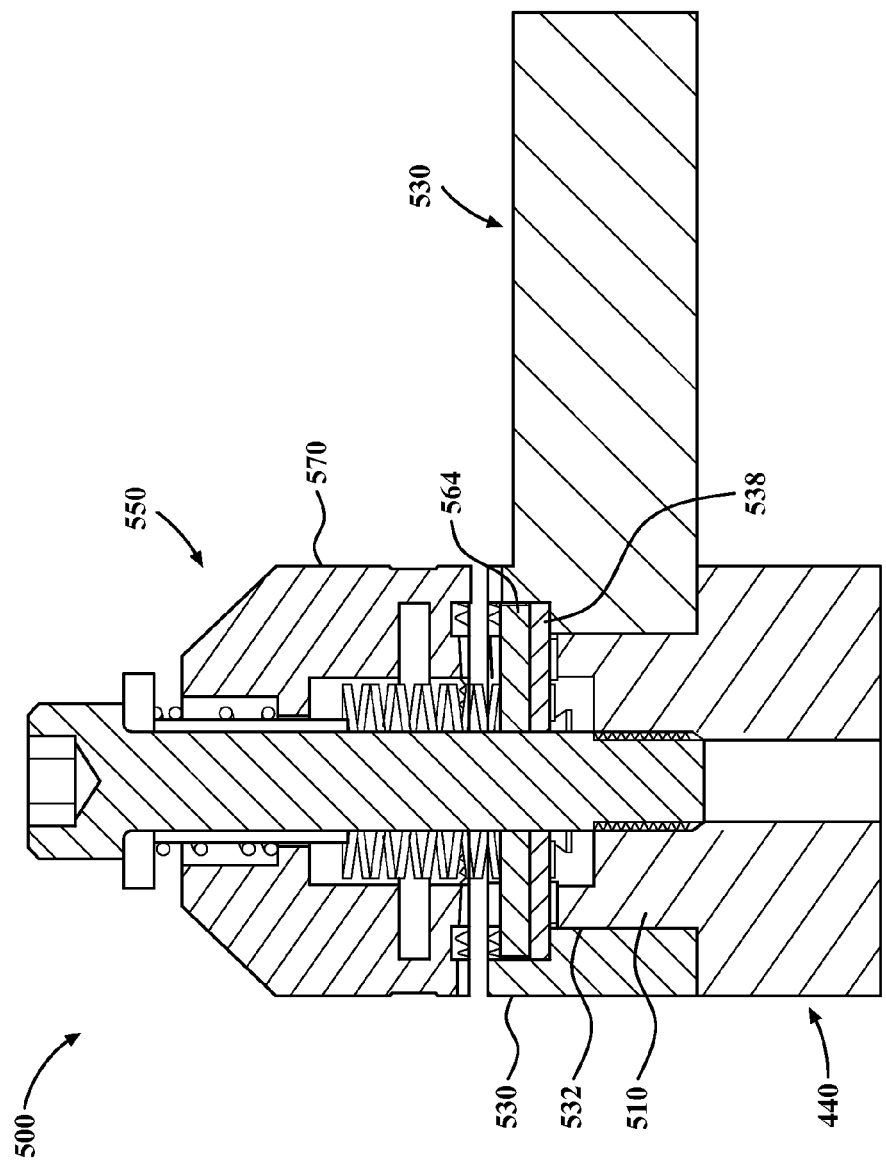
FIG. 23 is a cross-section view showing a rotationally adjustable locking joint of the modular tooling apparatus according to the sixth embodiment in a locked position.

FIG. 23 is a cross-sectional view showing one of the rotationally adjustable locking joints 500 in an unlocked position. In the unlocked position, the locking cap 570 has been moved away from and is spaced apart with respect to the female coupling structure 530 and the locking cap 570. With the locking cap 570 disengaged from the male coupling structure 510 and the female coupling structure 530, the male coupling structure 510 and the female coupling structure 530 can be rotated with respect to one another to allow rotational adjustment.

In the unlocked position, the friction member 564 engages the male coupling structure 510 and the female coupling structure 530 to resist rotation of the male coupling structure 510 with respect to the female coupling structure 530. For example, the friction member 564 can frictionally engage at least one of the male coupling structure 510 or the female coupling structure 530 to resist relative rotation of the male coupling structure 510 and the female coupling structure 530.

In the illustrated example, the radially extending fingers 566 are received in the slots 518 of the male coupling structure 510 such that the male coupling structure 510 and the friction member 564 rotate substantially in unison with one another, subject to a small amount of relative rotation of the radially extending finger 566 within the slots 518 that is provided due to manufacturing tolerances and to allow for easy assembly of the friction member 564 with respect to the male coupling structure 510. The friction pad 568 of the friction member 564 engages the shoulder 538 of the female coupling structure 530, and this frictional engagement resists rotation of the male coupling structure 510 with respect to the female coupling structure 530. The friction member 564 is urged into engagement with the female coupling structure 530 by the biasing force that is applied to the friction member 564 by the second biasing element 560. The male coupling structure 510 can nonetheless be rotated with respect to the female coupling structure 530 in response to application of force to at least one of the male coupling structure 510 or the female coupling structure 530 sufficient to overcome the friction force applied by the frictional engagement of the friction pad 568 with respect to the shoulder 538 of the female coupling structure 530. As a result, the male coupling structure 510 and the female coupling structure 530 can maintain their relative angular position when the locking cap 570 of the locking cap assembly 550 is moved to the unlocked position, but can then be adjusted with respect to one another. This allows for easier adjustment of the male coupling structure 510 with respect to the female coupling structure 530.

In operation, the modular tooling apparatus 10 of the present invention is assembled in a manner that allows the modular tooling 12 to reach and engage the appropriate work piece when manipulated by the manipulator. The modular tooling apparatus 300, as previously described, may be adjusted linearly and orbitally to allow the modular tooling 12 to be in a proper position relative to the work piece.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular tooling apparatus, comprising:
   a first coupler portion;
   a second coupler portion, wherein the first coupler portion and the second coupler portion are rotationally adjustable with respect to one another;
   a locking member that is moveable to a locked position, in which the locking member engages the first coupler portion and the second coupler portion to restrain the first coupler portion from rotating with respect to the second coupler portion, and an unlocked position in which the locking member is disengaged from and spaced apart from the first coupler portion and the second coupler portion; and
   a friction member that engages the first coupler portion and the second coupler portion to resist rotation of the first coupler portion with respect to the second coupler portion when the locking member is in the unlocked position, and to permit rotation of the first coupler portion with respect to the second coupler portion in response to application of force to at least one of the first coupler portion or the second coupler portion that is sufficient to overcome a friction force applied by the frictional engagement of the friction member with respect to the at least one of the first coupler portion or the second coupler portion when the locking member is in the unlocked position,
   wherein the friction member includes a plurality of radially extending portions, the first coupler portion includes a plurality of slots, the radially extending portions of the friction member extend through the slots of the first coupler portion past an outer periphery of the first coupler portion, the radially extending portions of the friction member engage the slots of the first coupler portion such that the friction member rotates substantially in unison with the first coupler portion, and the radially extending portions are in direct frictional engagement with a surface formed on the second coupler portion to resist rotation of the first coupler portion with respect to the second coupler portion when the locking member is in the unlocked position.

2. The modular tooling apparatus of claim 1, wherein the first coupler portion and the second coupler portion are concentrically arranged around a longitudinal axis.

3. The modular tooling apparatus of claim 1, wherein the second coupler portion defines a bore, and the first coupler portion is disposed at least partially within the bore of the second coupler portion.

4. The modular tooling apparatus of claim 1, wherein the friction member is in direct frictional engagement with a surface formed on at least one of the first coupler portion or the second coupler portion to resist rotation of the first coupler portion with respect to the second coupler portion when the locking member is in the unlocked position.

5. The modular tooling apparatus of claim 1, wherein the friction member is connected to the second coupler portion such that the friction member rotates substantially in unison with the first coupler portion and the friction member frictionally engages the second coupler portion to resist rotation of the first coupler portion with respect to the second coupler portion when the locking member is in the unlocked position.

6. The modular tooling apparatus of claim 1, further comprising:
   a first biasing element that is positioned between the locking member and the friction member for biasing the friction member into frictional engagement with at least one of the first coupler portion or the second coupler portion; and
   a second biasing element for biasing the locking member into engagement with the first coupler portion and the second coupler portion.

7. The modular tooling apparatus of claim 1, further comprising:
   a rod that extends along a longitudinal axis through the first coupler portion, the second coupler portion, and the locking member.

8. A modular tooling apparatus, comprising:
   a first coupler portion having a first contoured surface;
   a second coupler portion having a second contoured surface, wherein the first coupler portion and the second coupler portion are rotationally adjustable with respect to one another;
   a locking member having a third contoured surface and a fourth contoured surface, wherein the locking member is moveable to a locked position with respect to the first coupler portion and the second coupler portion in which the third contoured surface of the locking member engages the first contoured surface of the first coupler portion and the fourth contoured surface of the locking member engages the second contoured surface of the second coupler portion to restrain the first coupler portion from rotating with respect to the second coupler portion, and an unlocked position in which the locking member is disengaged from and spaced apart from the first coupler portion and the second coupler portion; and
   a friction member that engages the first coupler portion and the second coupler portion to resist rotation of the first coupler portion with respect to the second coupler portion when the locking member is in the unlocked position, and to permit rotation of the first coupler portion with respect to the second coupler portion in response to application of force to at least one of the first coupler portion or the second coupler portion that is sufficient to overcome a friction force applied by the frictional engagement of the friction member with respect to the at least one of the first coupler portion or the second coupler portion when the locking member is in the unlocked position.

9. The modular tooling apparatus of claim 8, wherein the first contoured surface and the second contoured surface are concentrically arranged around a longitudinal axis.

10. The modular tooling apparatus of claim 9, wherein the first contoured surface and the second contoured surface face a first direction that is parallel to the longitudinal axis, and the third contoured surface and the fourth contoured surface face a second direction that is parallel to the longitudinal axis and is opposite the first direction.

11. The modular tooling apparatus of claim 8, wherein the second coupler portion defines a bore, and the first coupler portion is disposed at least partially within the bore of the second coupler portion.

12. The modular tooling apparatus of claim 8, wherein the friction member is in direct frictional engagement with a surface formed on at least one of the first coupler portion or the second coupler portion to resist rotation of the first coupler portion with respect to the second coupler portion when the locking member is in the unlocked position.

13. The modular tooling apparatus of claim 8, wherein the friction member is connected to the second coupler portion such that the friction member rotates substantially in unison with the first coupler portion and the friction member frictionally engages the second coupler portion to resist rotation of the first coupler portion with respect to the second coupler portion when the locking member is in the unlocked position.

14. The modular tooling apparatus of claim 8, wherein the friction member includes a plurality of radially extending portions, the first coupler portion includes a plurality of slots, the radially extending portions of the friction member extend through the slots of the first coupler portion past an outer periphery of the first coupler portion, the radially extending portions of the friction member engage the slots of the first coupler portion such that the friction member rotates substantially in unison with the first coupler portion, and the radially extending portions are in direct frictional engagement with a surface formed on the second coupler portion to resist rotation of the first coupler portion with respect to the second coupler portion when the locking member is in the unlocked position.

15. The modular tooling apparatus of claim 8, further comprising:
a first biasing element that is positioned between the locking member and the friction member for biasing the friction member into frictional engagement with at least one of the first coupler portion or the second coupler portion; and
a second biasing element for biasing the locking member into engagement with the first coupler portion and the second coupler portion.

16. The modular tooling apparatus of claim 8, further comprising:
a rod that extends along a longitudinal axis through the first coupler portion, the second coupler portion, and the locking member.

17. A modular tooling apparatus, comprising:

a rod that extends along a longitudinal axis;

a first coupler portion that is substantially cylindrical and has a first contoured surface at an axial end thereof;

a second coupler portion that is substantially cylindrical, defines a bore having a shoulder formed therein, and has a second contoured surface at an axial end thereof, wherein the first coupler portion is at least partially disposed within the bore of the second coupler portion, the rod extends through the first coupler portion and the second coupler portion, and the first coupler portion and the second coupler portion are rotationally adjustable with respect to one another around the longitudinal axis;

a locking member having a third contoured surface and a fourth contoured surface, wherein the rod extends through the locking member, and the locking member is moveable to a locked position with respect to the first coupler portion and the second coupler portion in which the third contoured surface of the locking member engages the first contoured surface of the first coupler portion, and the fourth contoured surface of the locking member engages the second contoured surface of the second coupler portion to restrain the first coupler portion from rotating with respect to the second coupler portion, and an unlocked position in which the locking member is disengaged from and spaced apart from the first coupler portion and the second coupler portion; and a friction member that is connected to the second coupler portion such that the friction member rotates substantially in unison with the first coupler portion, and the friction member frictionally engages the shoulder in the bore in the second coupler portion to resist rotation of the first coupler portion with respect to the second coupler portion when the locking member is in the unlocked position, and to permit rotation of the first coupler portion with respect to the second coupler portion in response to application of force to at least one of the first coupler portion or the second coupler portion that is sufficient to overcome a friction force applied by the frictional engagement of the friction member with respect to the at least one of the first coupler portion or the second coupler portion when the locking member is in the unlocked position.

\* \* \* \* \*